US011533424B2

(12) United States Patent
Sato

(10) Patent No.: US 11,533,424 B2
(45) Date of Patent: Dec. 20, 2022

(54) INFORMATION PROCESSING APPARATUS FOR PERFORMING SETTING OF MONITORING CAMERA AND METHOD OF THE SAME

(71) Applicant: CANON KABUSHIKI KAISHA, Tokyo (JP)

(72) Inventor: Shunsuke Sato, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 137 days.

(21) Appl. No.: 16/799,659

(22) Filed: Feb. 24, 2020

(65) Prior Publication Data

US 2020/0280683 A1 Sep. 3, 2020

(30) Foreign Application Priority Data

Feb. 28, 2019 (JP) .............................. JP2019-036157

(51) Int. Cl.
*H04N 5/225* (2006.01)
*H04N 9/04* (2006.01)
(Continued)

(52) U.S. Cl.
CPC ..... *H04N 5/232127* (2018.08); *G06V 10/255* (2022.01); *G06V 20/41* (2022.01); *H04N 5/23206* (2013.01); *G06V 2201/07* (2022.01)

(58) Field of Classification Search
CPC ......... H04N 5/232127; H04N 5/23206; H04N 5/22521; H04N 5/23216; H04N 7/183;
(Continued)

(56) References Cited

U.S. PATENT DOCUMENTS

2007/0025722 A1* 2/2007 Matsugu .................. G06T 7/97
396/263
2012/0249790 A1* 10/2012 Golan ................. G06K 9/00362
348/143
(Continued)

FOREIGN PATENT DOCUMENTS

JP 2011215829 A 10/2011
JP 2017073670 A 4/2017

OTHER PUBLICATIONS

Ying Zhang, et al., Video Anomaly Detection Based on Locality Sensitive Hashing Filters, Pattern Recognition 59, 2016, pp. 302-311, Elsevier Ltd.
(Continued)

*Primary Examiner* — Stephen P Coleman
(74) *Attorney, Agent, or Firm* — Canon U.S.A., Inc. IP Division

(57) ABSTRACT

An information processing apparatus includes a setting unit configured to set an imaging condition under which an imaging apparatus captures a video, a region determination unit configured to determine a detectable region in which a detection target is detectable in the video, based on the imaging condition, an acquisition unit configured to acquire a desired detection condition under which a user desires detection for the detection target to be executed, and a condition determination unit configured to determine a detection condition under which the detection target is detected from the video, based on the desired detection condition and the detectable region determined based on at least one imaging condition.

17 Claims, 16 Drawing Sheets

(51) Int. Cl.
H04N 5/232 (2006.01)
G06V 10/20 (2022.01)
G06V 20/40 (2022.01)

(58) Field of Classification Search
CPC ............ G06K 9/00718; G06K 9/3241; G06K 2209/21; G06K 9/00369; G06K 9/52; G06K 2209/27; G06K 9/00771; G08B 13/19691; G08B 13/1968; G08B 21/0476
USPC .................................................... 348/207.99
See application file for complete search history.

(56) References Cited

U.S. PATENT DOCUMENTS

| | | | | |
|---|---|---|---|---|
| 2013/0343604 | A1* | 12/2013 | Adachi | G06K 9/00771 382/103 |
| 2016/0232418 | A1* | 8/2016 | Inoshita | G06K 9/4642 |
| 2018/0220065 | A1* | 8/2018 | Kobayashi | H04N 5/23219 |

OTHER PUBLICATIONS

Leila Shafarenko, et al., Automatic Watershed Segmentation of Randomly Textured Color Images, IEEE Transactions on Image Processing, Nov. 1997, 16 pages, vol. 6, No. 11.
J.K. Lawder, et al., Querying Multi-Dimensional Data Indexed Using the Hilbert Space-Filling Curve, ACM Sigmod Record, Mar. 2001, 6 pages, vol. 30, Issue 1.

* cited by examiner

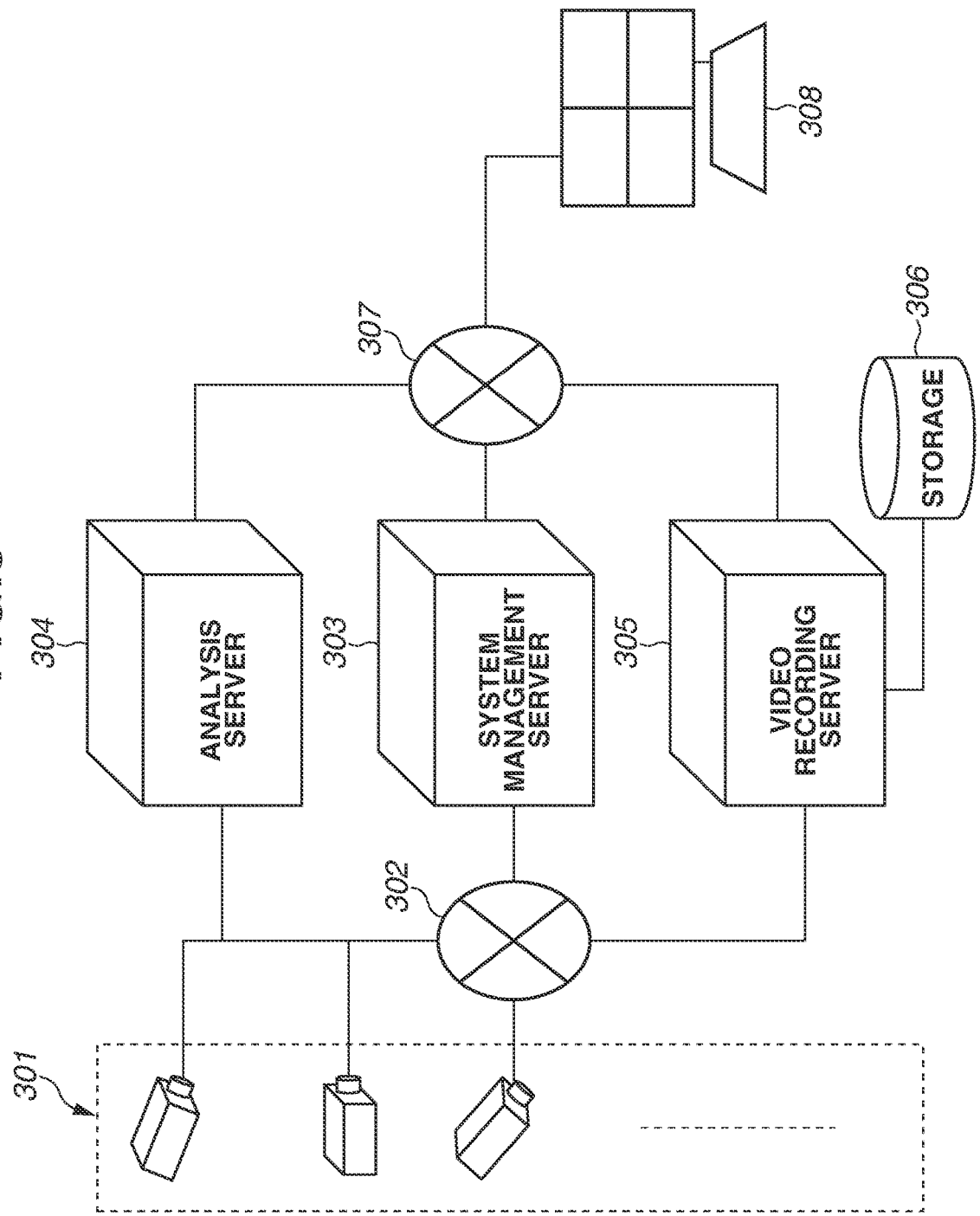

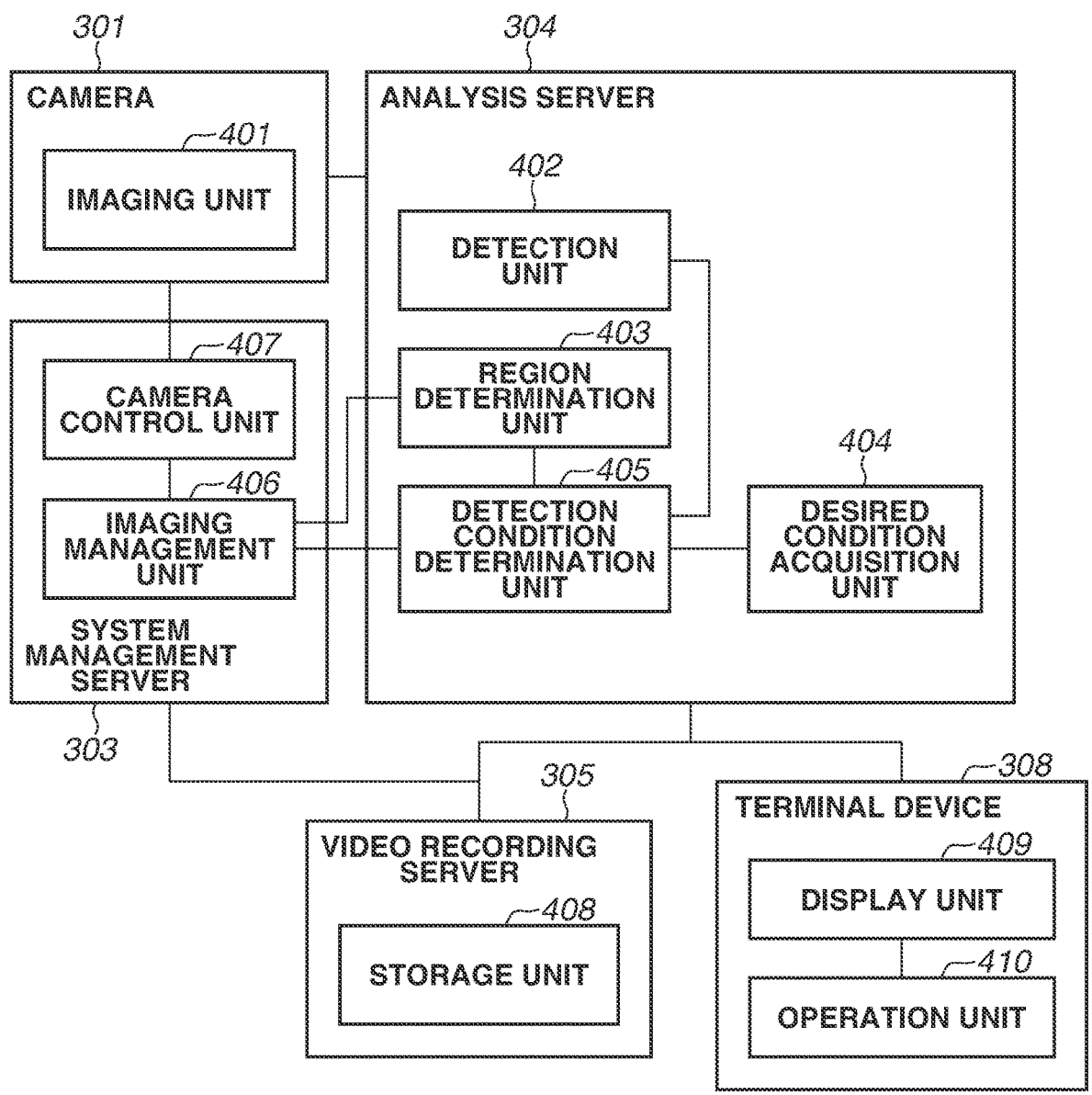

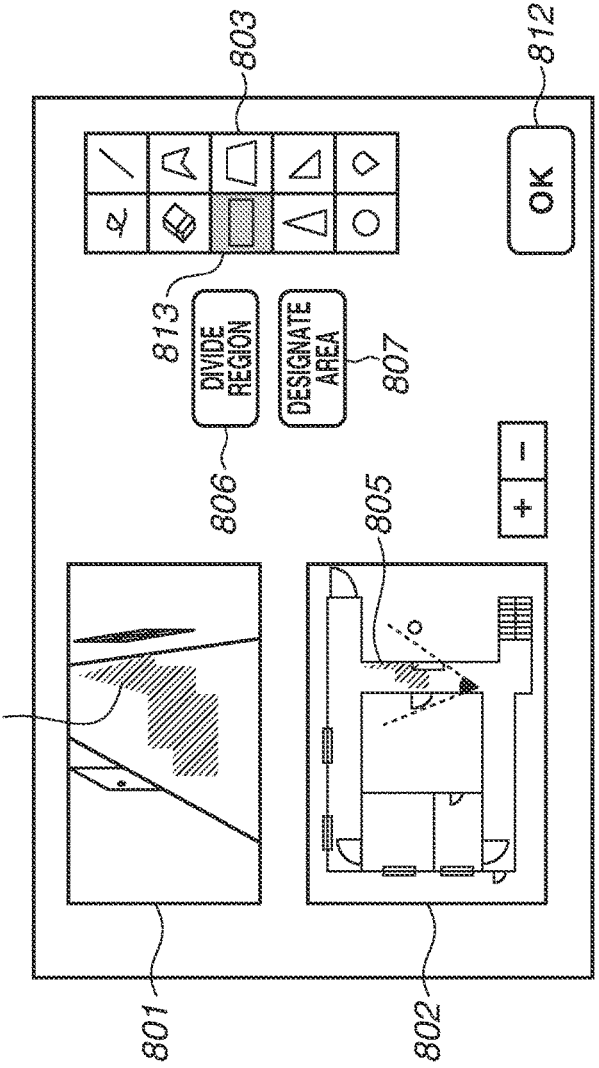
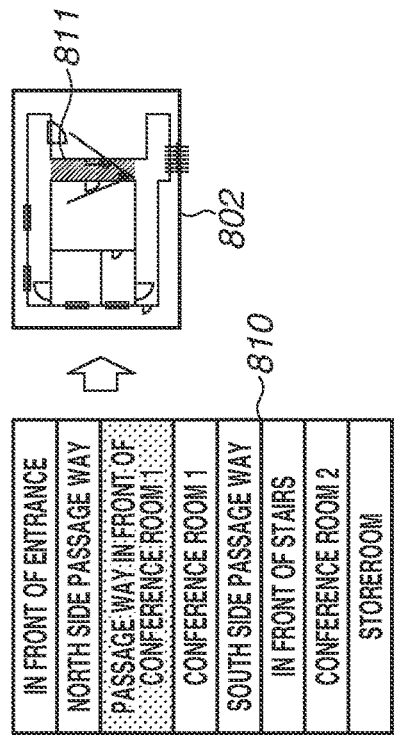
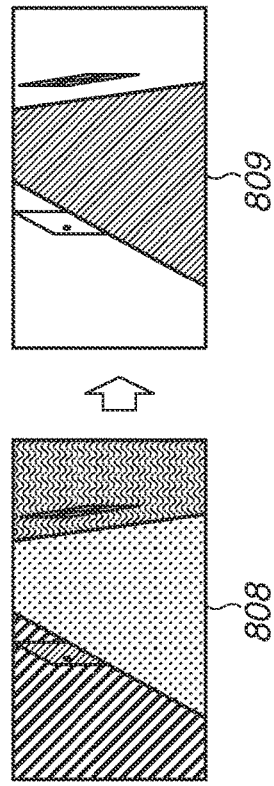

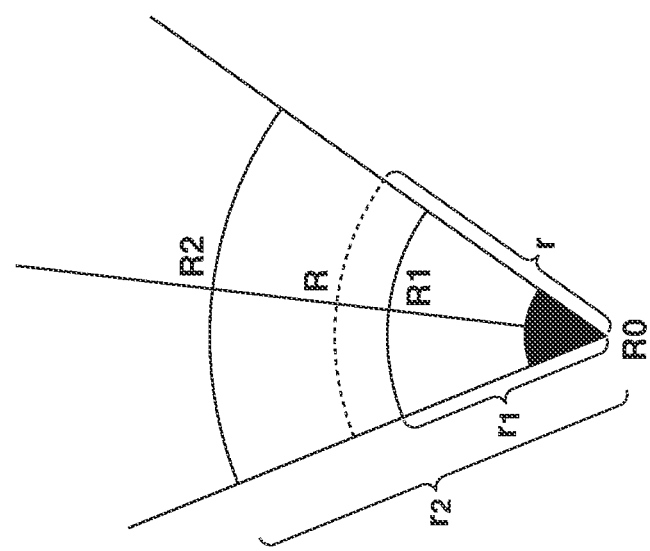
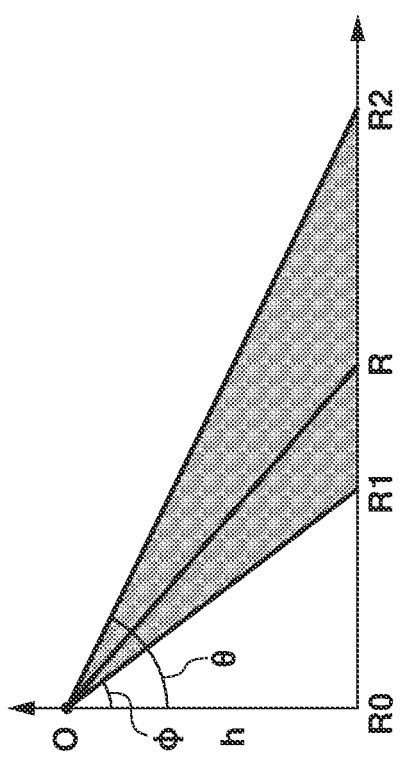
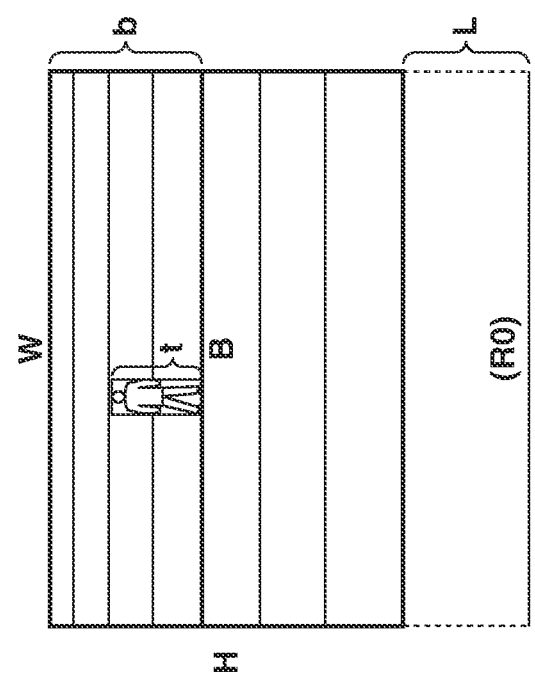
FIG.9A
FIG.9B
FIG.9C

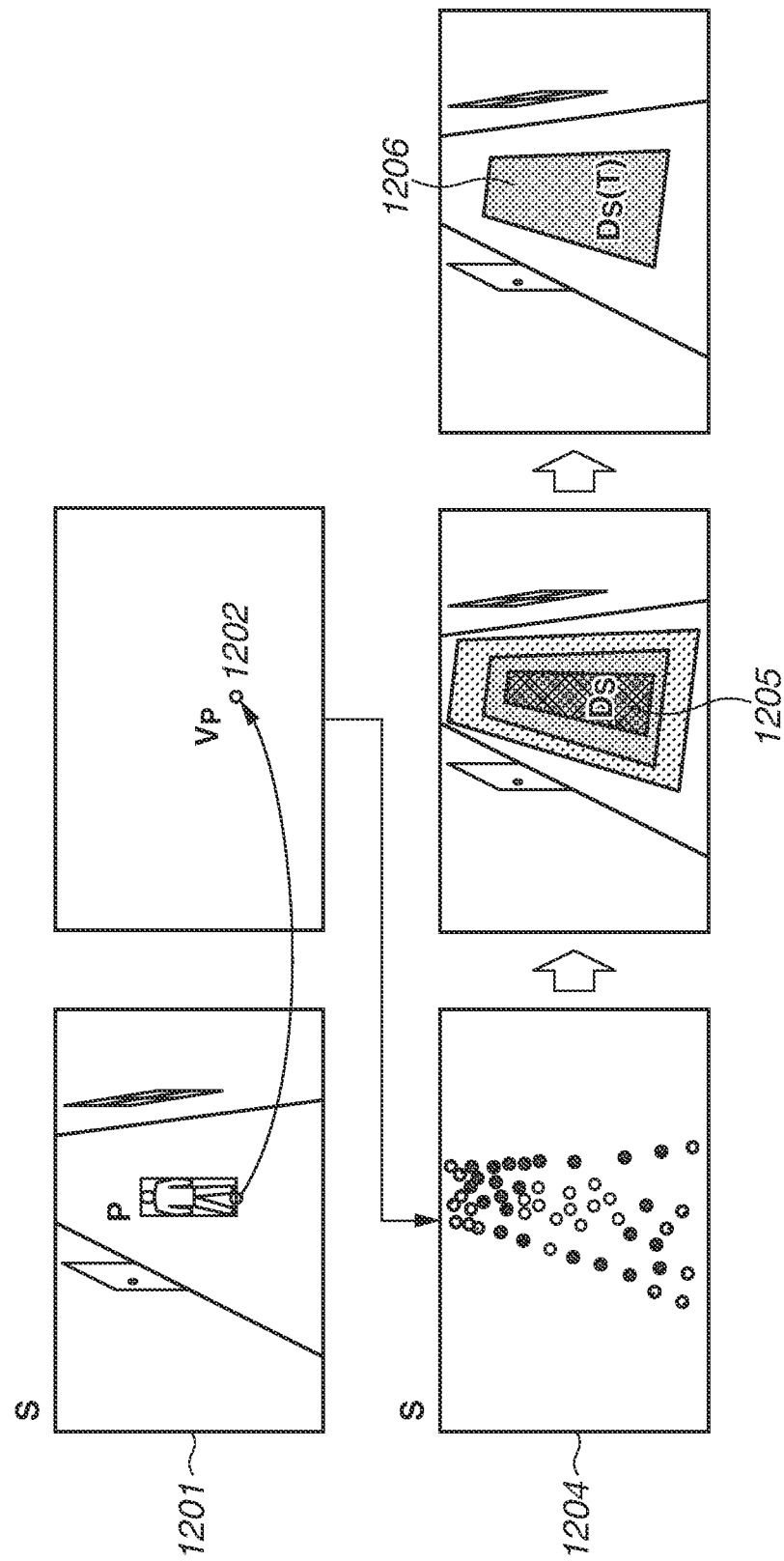

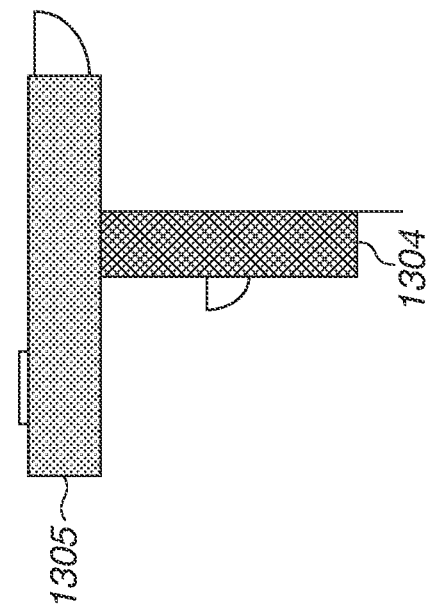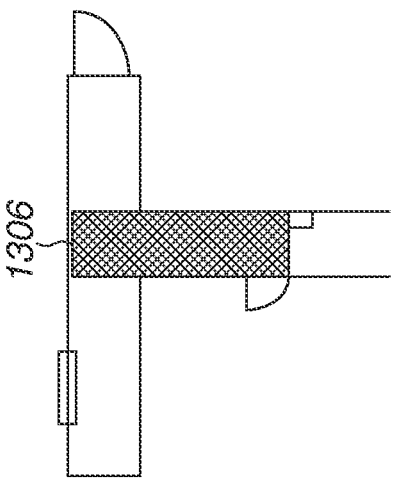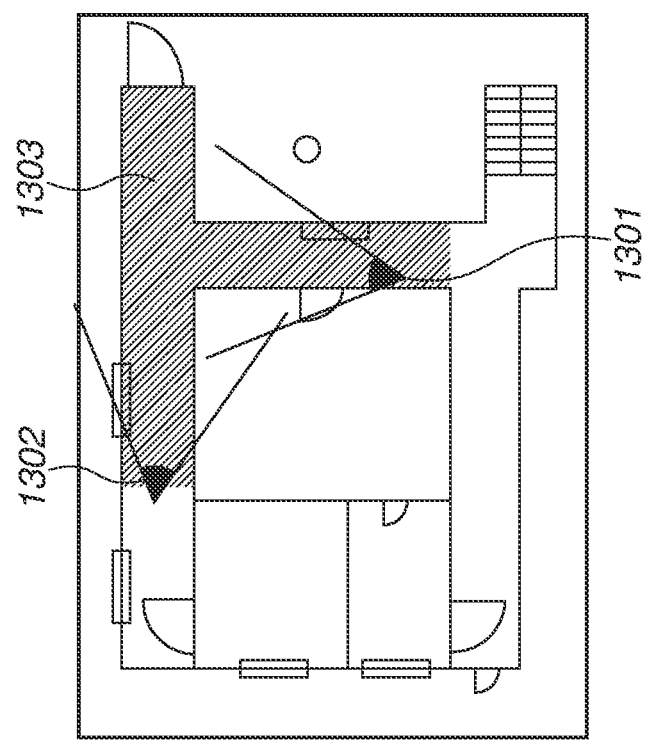

| TYPE | ITEM | RANGE OF VALUE | |
|---|---|---|---|
| CAMERA 1 | PAN | -30° | -20° |
| CAMERA 1 | TILT | 0° | 6° |
| CAMERA 1 | ZOOM | x0.25 | x1.0 |
| CAMERA 2 | PAN | -30° | -20° |
| CAMERA 2 | TILT | 0° | 6° |
| CAMERA 2 | ZOOM | x0.25 | x1.0 |
| ENVIRONMENT | BLIND | OPENED | CLOSED |
| ENVIRONMENT | ILLUMINATION | OFF | HALF LIT | ALL LIT |

| TYPE | ITEM | VALUE |
|---|---|---|
| CAMERA 1 | PAN | -10° |
| CAMERA 1 | TILT | 6° |
| CAMERA 1 | ZOOM | x1.0 |
| CAMERA 2 | PAN | 20° |
| CAMERA 2 | TILT | 0° |
| CAMERA 2 | ZOOM | x2.0 |
| ENVIRONMENT | BLIND | OPENED |
| ENVIRONMENT | ILLUMINATION | ALL LIT |

| TYPE | ITEM | VALUE |
|---|---|---|
| CAMERA 1 | PAN | -10° |
| CAMERA 1 | TILT | 6° |
| CAMERA 1 | ZOOM | x1.0 |
| ENVIRONMENT | BLIND | OPENED |
| ENVIRONMENT | ILLUMINATION | ALL LIT |

| TYPE | ITEM | VALUE |
|---|---|---|
| CAMERA 2 | PAN | 20° |
| CAMERA 2 | TILT | 0° |
| CAMERA 2 | ZOOM | x2.0 |
| ENVIRONMENT | ILLUMINATION | ALL LIT |

FIG.14E

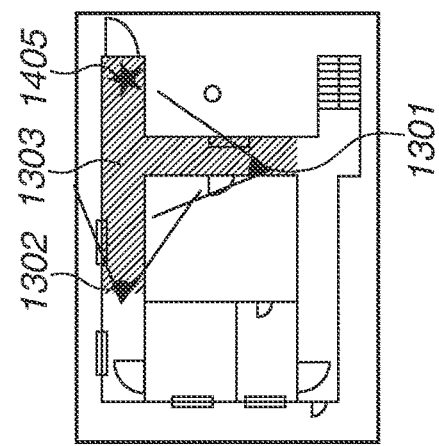

FIG.16A
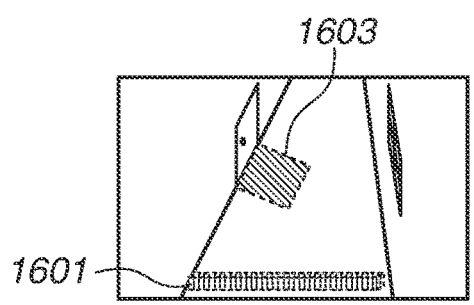
FIG.16B
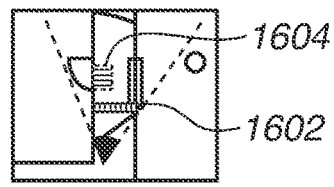
FIG.16C
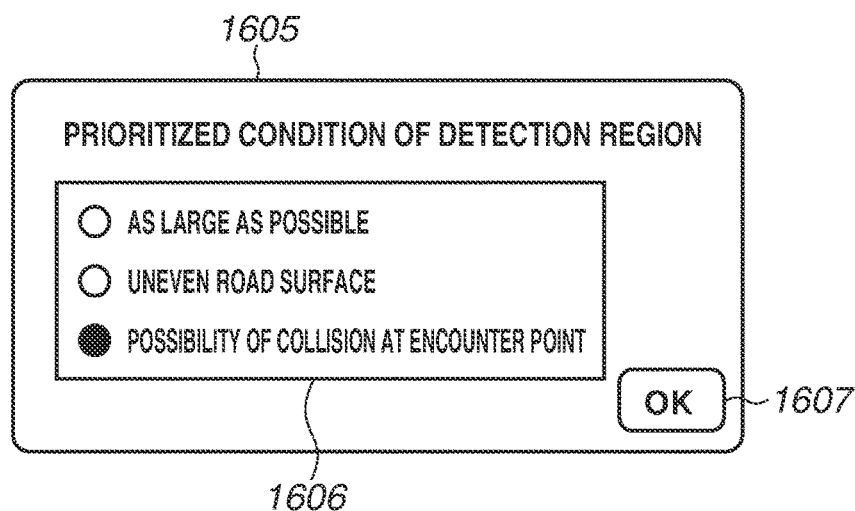
FIG.16D  FIG.16E  FIG.16F
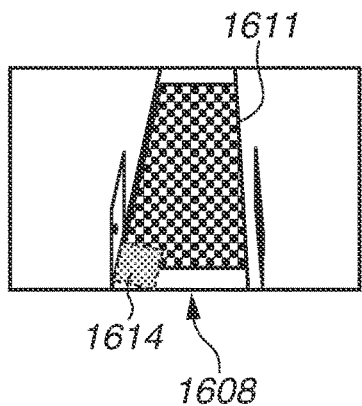 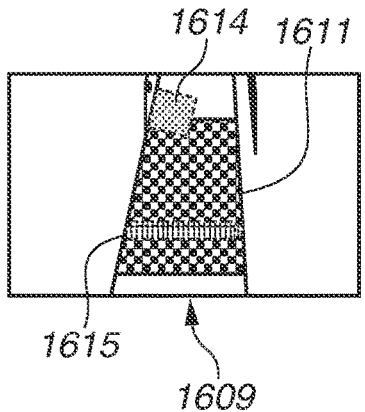 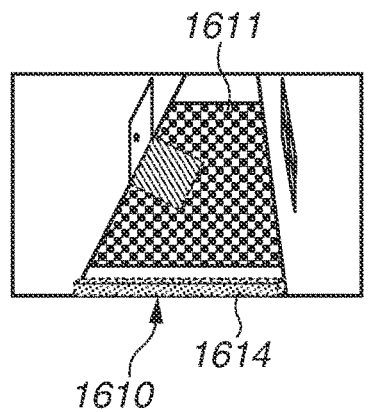

INFORMATION PROCESSING APPARATUS FOR PERFORMING SETTING OF MONITORING CAMERA AND METHOD OF THE SAME

BACKGROUND OF THE INVENTION

Field of the Invention

The present disclosure relates to an information processing technique of performing various settings in a monitoring camera system.

Description of the Related Art

In a system that performs video recognition on a video captured by a monitoring camera, and reports the detection result to a user, a function of designating a region in which detection is to be performed is demanded for the purpose of preventing an erroneous report and reducing calculation load. As an example of a method in which a user easily designates a reasonable detection range, Japanese Patent Application Laid-Open No. 2017-73670 discusses a method of deriving a region in which detection processing of a human body can be performed, based on an imaging direction of an imaging apparatus, and displaying the derived region. In addition, Japanese Patent Application Laid-Open No. 2011-215829 discusses a method of extracting information regarding a blind area undetectable from positioning information of a monitoring target, and displaying the extracted information.

The above-described methods display a region detectable in a current imaging condition of an imaging apparatus, but the displayed region does not always correspond to a region where the user desires detection to be performed. Thus, each time a camera is installed, the user needs to adjust an imaging condition while checking whether detection can be performed in a region in which the user desires detection to be performed, which places a burden on the user.

In view of the foregoing, there is a need in the art to facilitate adjustment for performing detection processing of a detection target in a region in a video in which the user desires detection to be performed.

SUMMARY OF THE INVENTION

According to an aspect of the present disclosure, an information processing apparatus includes a setting unit configured to set an imaging condition under which an imaging apparatus captures a video, a region determination unit configured to determine a detectable region in which a detection target is detectable in the video, based on the imaging condition, an acquisition unit configured to acquire a desired detection condition under which a user desires detection for the detection target to be executed, and a condition determination unit configured to determine a detection condition under which the detection target is detected from the video, based on the desired detection condition and the detectable region determined based on at least one imaging condition.

Further features of the present disclosure will become apparent from the following description of exemplary embodiments with reference to the attached drawings.

BRIEF DESCRIPTION OF THE DRAWINGS

FIG. 3 is a configuration diagram illustrating an example of an overall configuration of a system.

FIG. 4 is a functional block diagram according to a first exemplary embodiment

FIGS. 8A, 8B and 8C are diagrams each illustrating an example of a desired detection region designation screen according to the first exemplary embodiment.

FIGS. 9A, 9B and 9C are explanatory diagrams illustrating a method of obtaining a detectable region according to the first exemplary embodiment.

FIG. 12 is an explanatory diagram illustrating a detectable region determination method according to the second exemplary embodiment.

FIGS. 13A, 13B and 13C are explanatory diagrams illustrating determination of a detection region according to a third exemplary embodiment.

FIGS. 14A to 14E are explanatory diagrams illustrating a configuration example of an imaging condition according to the third exemplary embodiment.

FIGS. 16A to 16F are explanatory diagrams illustrating a detection region determination method according to a fifth exemplary embodiment.

DESCRIPTION OF THE EMBODIMENTS

Figure 1:
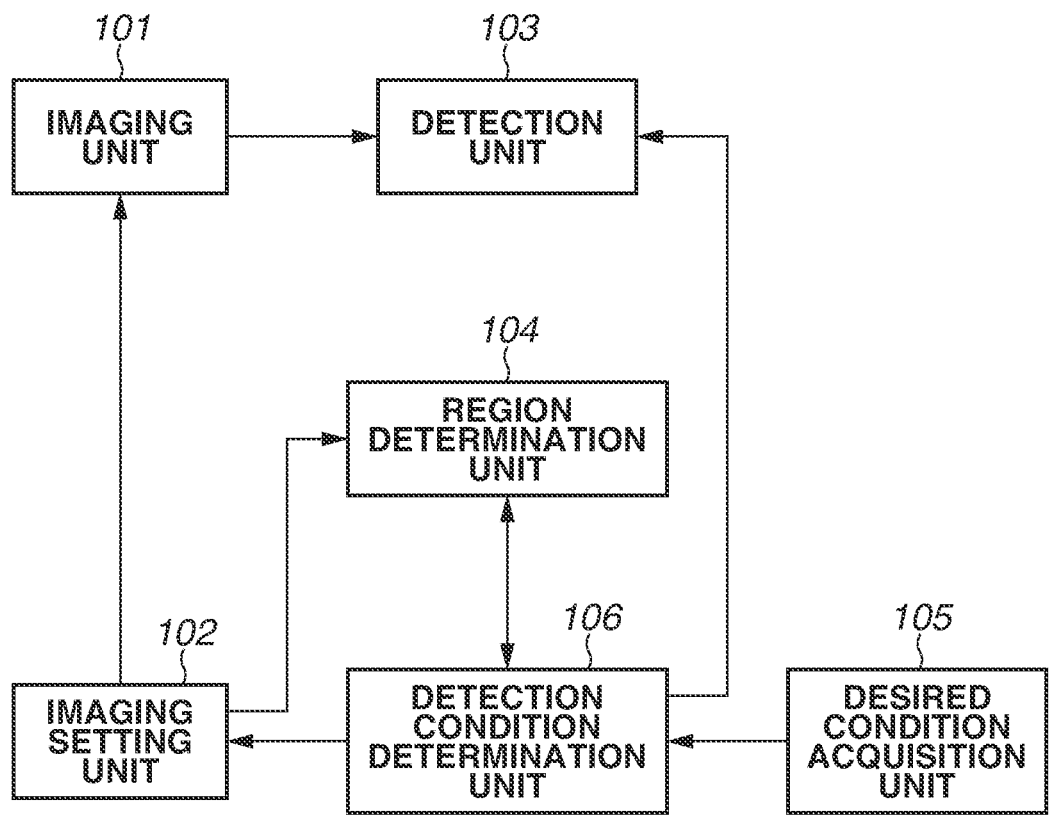
FIG. 1 is a functional block diagram illustrating an overview of components common to exemplary embodiments.

Hereinafter, exemplary embodiments of the present disclosure will be described in detail with reference to the attached drawings. The configurations to be described in the following exemplary embodiments are mere examples, and the present disclosure is not limited to the configurations illustrated in the drawings.

Figure 2:
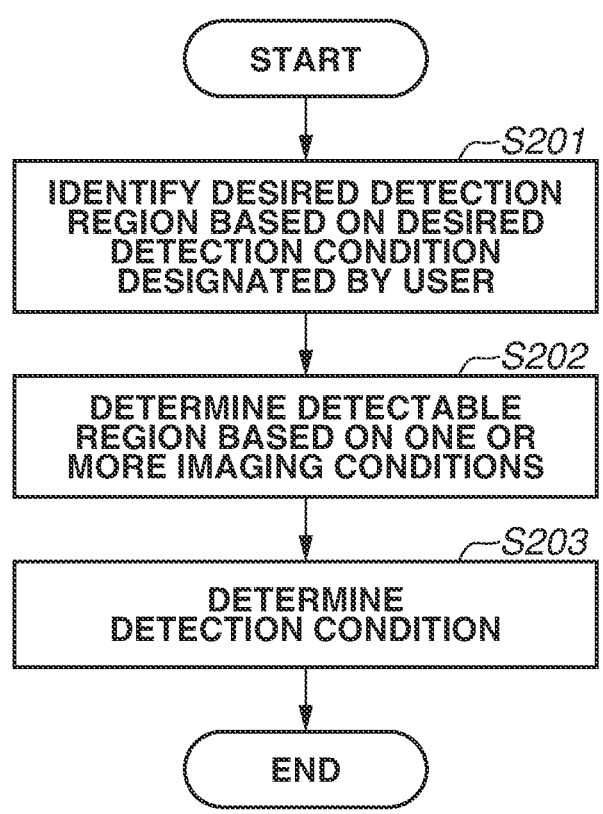
FIG. 2 is a flowchart illustrating an overview of processing common to exemplary embodiments.

First of all, overviews of components and a processing flow common to exemplary embodiments to be described below will be described with reference to FIGS. 1 and 2. The components and the processing flow to be described here embody entities in executing the invention by corresponding functional blocks and processing steps, which will be clearly indicated in each exemplary embodiment to be described below, Thus, the following description is not intended to be given assuming that the components and the processing flow to be described with reference to FIGS. 1 and 2 are directly implemented as an exemplary embodiment, FIG. 1 is a functional block diagram illustrating an overview of functions common to information processing apparatuses according to exemplary embodiments of the present disclosure. An imaging unit 101, an imaging setting unit 102, a detection unit 103, a region determination unit 104, a detection condition determination unit 106, and a desired condition acquisition unit 105 that are illustrated in FIG. 1 are components included in the information processing apparatus.

The imaging unit 101 captures a video.

The imaging setting unit 102 performs a setting and a change of an imaging condition under which the imaging unit 101 captures a video. The details of the imaging condition will be described below. Information regarding the imaging condition set by the imaging setting unit 102 is transmitted to the region determination unit 104.

The detection unit 103 has a function of detecting a predetermined detection target from an input video. The detection unit 103 detects a detection target from an input video based on a detection condition determined by the detection condition determination unit 106 to be described below. In the following description, a person (human body) is used as an example of a detection target, but the detection target is not limited to a person.

The region determination unit 104 determines a region in which the detection unit 103 can detect a detection target in an input video. In other words, the region determination unit 104 determines a detectable region in which a detection target is detectable, based on an imaging condition set by the imaging setting unit 102. The details will be described below. information regarding the detectable region determined by the region determination unit 104 is transmitted to the detection condition determination unit 106.

The desired condition acquisition unit 105 acquires a desired detection condition for identifying a region that can be estimated as a region in which the user desires the detection unit 103 to detect a detection target in a video. Specifically, if the user designates a desired detection condition, the desired condition acquisition unit 105 identifies a desired detection region that can be estimated as a region in which the user desires the detection unit 103 to detect a detection target in a video, based on the desired detection condition. Information regarding the desired detection region identified by the desired condition acquisition unit 105 is transmitted to the detection condition determination unit 106.

The detection condition determination unit 106 determines a detection condition under which the detection unit 103 detects a detection target. The detection condition includes the above-described imaging condition. The detection condition determination unit 106 determines the detection condition based on the desired detection region identified by the desired condition acquisition unit 105, and a detectable region determined by the region determination unit 104 based on at least one imaging condition. The details will be described below. Information regarding the detection condition determined by the detection condition determination unit 106 is transmitted to the detection unit 103.

FIG. 2 is a flowchart illustrating an overview of a processing flow common to the information processing apparatus according to the present exemplary embodiment. In the description of the flowchart illustrated in FIG. 2, processing steps S201 to S203 will be each simply indicated as steps S201 to S203. The same applies to other flowcharts to be described below.

First of all, in step S201, the desired condition acquisition unit 105 receives a desired detection condition designated by the user, and identifies a desired detection region based on the desired detection condition.

Next, in step S202, the region determination unit 104 determines a detectable region based on one or more imaging conditions among various imaging conditions set by the imaging setting unit 102.

Next, in step S203, the detection condition determination unit 106 determines a detection condition based on the desired detection region identified in step S201 and the detectable region determined in step S202.

Hereinafter, a specific configuration of an information processing apparatus according to an exemplary embodiment will be described. Components and processing details in the functional blocks and the processing steps that have been schematically described with reference to FIGS. 1 and 2 will be specifically described in the exemplary embodiments to be described below.

An example of a configuration of an information processing apparatus according to a first exemplary embodiment will be described with reference to FIG. 3.

A monitoring camera unit 301 includes a plurality of monitoring cameras, and each monitoring camera is installed at a location to be monitored, and transmits a video being captured. For obtaining a video of a target monitoring location, each monitoring camera is installed at appropriate height and angle in an appropriate imaging direction. An imaging viewing angle is also set.

Each monitoring camera of the monitoring camera unit 301, and a system management server 303, an analysis server 304, and a video recording server 305, which will be described below, are connected by a camera network 302. The camera network 302 includes a local area network (LAN), for example, and connects the system management server 303, the analysis server 304, and the video recording server 305 such that each of the components can acquire a video of each camera.

The system management server 303, the analysis server 304, and the video recording server 305 are also connected by a client network 307 different from the camera network 302.

The client network 307 includes a LAN, for example. In addition, a terminal device 308 of the user is also connected to the client network 307.

The terminal device 308 is an arithmetic device including a display. The terminal device 308 requests a video of a monitoring camera designated by the user to the system management server 303, acquires the video of the monitoring camera via the system management server 303, and displays the acquired video. The user can thereby perform monitoring while viewing the video of the designated monitoring camera. The terminal device 308 acquires a past video recorded in the video recording server 305 and an analysis result from the analysis server 304, and also receives a notification. The user can thereby view the past video and the analysis result, and can also receive the notification.

The system management server 303 is an arithmetic device in which video management system (VMS) software operates. The system management server 303 holds setting information about each monitoring camera of the monitoring camera unit 301, the analysis server 304, and the video recording server 305, and manages the operations of these.

The analysis server 304 is an arithmetic device. In accordance with the setting held by the system management server 303, the analysis server 304 analyzes a video transmitted from each monitoring camera of the monitoring camera unit 301, and a video recorded in the video recording server 305. The analysis server 304 performs recognition processing, such as face authentication, human tracking, human flow measurement, invasion detection, person attribute detection, weather detection, and congestion detection, as analysis processing in accordance with an installation point of each monitoring camera of the monitoring camera unit 301. In addition, the analysis server 304 collects the results of these types of recognition processing, and notifies the results to the terminal device 308 of the user in accordance with the setting held by the system management server 303.

In the present exemplary embodiment, as an example of a detection target and recognition processing to be performed on the detection target, a case of recognizing a person Who is having an abnormal behavior in a video is used as described below. Nevertheless, a detection target and recognition processing are not limited to the case. For example, a specific person, the type of an automobile, or text may be detected from a video as a detection target, and a planned public or social event or a time slot of the event may be recognized. In addition, in detecting a detection target, information such as voice or image metadata that is associated with a video may be used in the detection, In accordance with the setting held by the system management server 303, the video recording server 305 records a video acquired from each camera of the monitoring camera unit 301, in a storage 306. Then, the video recording server 305 transmits a recorded video in accordance with a request from the system management server 303, the analysis server 304, or the terminal device 308. The video recording server 305 also saves metadata indicating an analysis result of the analysis server 304 together with the video. The storage 306 includes a recording medium such as a hard disc, and a micro processing unit (MPU). In the storage 306, a storage on a network such as a network attached storage (NAS), a storage area network (SAN), or a cloud service may be used in place of a recording medium.

In the present exemplary embodiment, the monitoring camera unit 301, the system management server 303, the analysis server 304, the video recording server 305, and the terminal device 308 are assumed to be different computer devices, but the configuration is not limited to such a configuration. For example, the system management server 303, the analysis server 304, and the video recording server 305 may be implemented as applications in one server apparatus or as virtual servers. In addition, the system management server 303 and the analysis server 304 may include the functions of the terminal device 308. In addition, each monitoring camera of the monitoring camera unit 301 may be equipped with the functions of the analysis server 304 and the video recording server 305.

In addition, the monitoring cameras of the monitoring camera unit 301 may be divided into a plurality of groups, and a plurality of analysis servers 304 and video recording servers 305 that are assigned to the respective groups may be provided. Furthermore, the system management server 303 may be implemented as an aggregation of edge servers installed for the respective groups of the monitoring cameras and a central server that controls the edge servers.

FIG. 4 is a functional block diagram illustrating a functional configuration of the information processing apparatus according to the first exemplary embodiment. The information processing apparatus according to the present exemplary embodiment includes an imaging unit 401, a detection unit 402, a region determination unit 403, a desired condition acquisition unit 404, a detection condition determination unit 405, an imaging management unit 406, a camera control unit 407, a storage unit 408, a display unit 409, and an operation unit 410.

The imaging unit 401 corresponds to the monitoring camera unit 301 illustrated in FIG. 3. Each monitoring camera included in the imaging unit 401 is an image capturing apparatus including an image sensor, a lens, a motor that drives these, and an MPU that controls these. Each of the monitoring cameras captures a moving image and converts the captured moving image into electronic data. The plurality of monitoring cameras of the imaging unit 401 is connected by a network such as a LAN. The imaging unit 401 also corresponds to the imaging unit 101 in the functional block diagram in FIG. 1 that has been described above.

The detection unit 402, the region determination unit 403, the desired condition acquisition unit 404, and the detection condition determination unit 405 are included in the analysis server 304 illustrated in FIG. 3.

The detection unit 402 detects a detection target included in an input video. In the present exemplary embodiment, a person (human body) is used as a detection target. The detection unit 402 can detect a person from an input video, and can further detect an abnormal behavior of the person. A known method can be used for the detection of an abnormal behavior. For example, a known method of determining a degree of deviation from a normal behavior using locality sensitive hashing (LSH) as discussed in "ZHANG, Ying, et al. Video anomaly detection based on locality sensitive hashing filters. Pattern Recognition, 2016, 59: 302-311" can be used. The detection unit 402 corresponds to the detection unit 103 in FIG. 1.

Based on a current imaging condition of the monitoring camera of the imaging unit 401, the region determination unit 403 determines, as a detectable region, a region in which a detection target is estimated to be detectable by the detection unit 402 in an input video. The region determination unit 403 corresponds to the region determination unit 104 in FIG. 1.

As described below, based on an instruction from the user, the desired condition acquisition unit 404 acquire a desired detection condition for identifying a region in which the user desires detection to be performed in a video. Then, based on the acquired desired detection condition, the desired condition acquisition unit 404 identifies a desired detection region that is estimated to be a region in which the user desires the detection unit 402 to detect a detection target in a video. Information regarding the desired detection region identified by the desired condition acquisition unit 404 is transmitted to the detection condition determination unit 405. The desired condition acquisition unit 404 corresponds to the desired condition acquisition unit 105 in FIG. 1.

The detection condition determination unit 405 collects information regarding an imaging condition necessary for the estimation of a detectable region from the imaging management unit 406, and defines a detection condition to be actually used for the detection by the detection unit 402, based on the collected information and the desired detection condition. The detection condition includes an external factor affecting the accuracy of the detection in which the detection unit 402 detects a detection target from a video, and a detection parameter, and the following imaging condition and detection region. The detection condition determination unit 405 corresponds to the detection condition determination unit 106 in FIG. 1.

The imaging condition is information for identifying an imaging range used in acquiring a video by the imaging unit 401, and various conditions contributing to the quality of a video, and includes a camera installation position, a camera angle, and various parameters of a camera. The imaging condition may further include an illumination condition in an imaging environment. The details will be described below.

The detection region is defined so as to conform to a desired detection condition as far as possible, from a region in a video in which the detection unit 402 performs detection processing. The detection unit 402 detects a detection target that appears in a detection region, from a video captured under an imaging condition included in the detection condition.

The imaging management unit 406 and the camera control unit 407 are components included in the system management server 303 illustrated in FIG. 3.

The imaging management unit 406 manages an imaging condition defined based on a current installation situation of monitoring cameras of the imaging unit 401, and also changes an imaging condition in accordance with a request from the analysis server 304. The imaging condition managed by the imaging management unit 406 includes a camera installation position including an installation height of each monitoring camera of the imaging unit 401, a camera angle, and various setting parameters of cameras, which have been described above. The setting parameters include an angle of pan or tilt that defines an imaging direction of a monitoring camera, and a setting value of zoom that determines an enlargement ratio (imaging magnification). The imaging management unit 406 corresponds to the imaging setting unit 102 in FIG. 1.

The camera control unit 407 controls the imaging unit 401 to set an imaging condition instructed by the imaging management unit 406 in each monitoring camera of the imaging unit 401.

The storage unit 408 corresponds to the video recording server 305 and the storage 306 illustrated in FIG. 3. The storage unit 408 includes a recording medium such as a hard disc, and an MPU. The storage unit 408 saves a video captured by the imaging unit 101, and setting information of an imaging condition managed by the imaging management unit 406. The storage unit 408 also saves a captured video, and metadata such as information indicating a relationship with setting information of an imaging condition under which the video is captured, and information regarding imaging time and date.

The display unit 409 and the operation unit 410 are included in the terminal device 308 illustrated in FIG. 3.

The display unit 409 includes a liquid crystal screen and an MPU that controls the liquid crystal screen. The display unit 409 presents, to the user, various types of information such as a captured video and information regarding an imaging condition, and also creates and displays a user interface (UI) screen to be used by the user in performing operations, The operation unit 410 includes a switch and a touch panel, senses an operation performed by the user, and inputs the operation to the information processing apparatus. In the operation unit 410, other pointing devices such as a mouse and a trackball may be used in place of the touch panel.

Next, examples of an operation of the display unit 409 and an operation performed by the user in the present exemplary embodiment will be described with reference to FIGS. 5A to 5C and 6A to 6E.

Figure 5A:
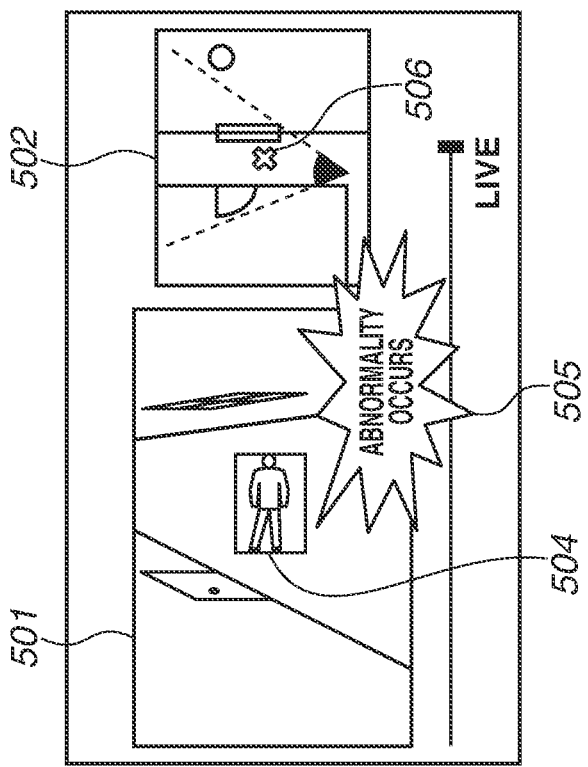
FIGS. 5A, 5B, and 5C are diagrams each illustrating an example of a display screen in monitoring according to the first exemplary embodiment.

FIG. 5A is a diagram illustrating a screen example in a state in which the display unit 409 displays a video being captured by the imaging unit 401. The monitoring camera of the imaging unit 401 is installed to capture a video of a location set as a monitoring target, and the display unit 409 displays a current camera video 501 of the monitoring camera on the screen. The user checks whether an abnormality occurs in the monitoring target location while viewing the video on the screen. The display unit 409 also displays a top view map 502 on the screen, and the top view map 502 displays an icon 503 indicating a camera position and a viewing angle. The user can thereby check a range in which the monitoring camera is currently capturing a video as the camera video 501.

The top view map 502 is a layout diagram viewed from the above illustrating a location of a building in which a monitoring camera is installed, and a range in which the camera video 501 is captured by the monitoring camera. The top view map 502 is created based on three-dimensional environmental information indicating an installation position and a height of the monitoring camera, and the arrangement of a wall surface and an object around the monitoring camera. The three-dimensional environmental information is created in advance based on information input by an installation personnel by performing measurement when the monitoring camera is installed, information regarding a measuring device such as a distance measuring device, an altimeter, or a global positioning system (GPS) included in the monitoring camera, a design drawing of a building in which the monitoring camera is installed, and a layout drawing of objects. The three-dimensional environmental information and a range in which the video is currently being captured as the camera video 501 are always associated by projection transform. In addition, the three-dimensional environmental information is appropriately updated in accordance with a change in an imaging condition such as a camera angle and a zoom setting of the monitoring camera.

Figure 5B:
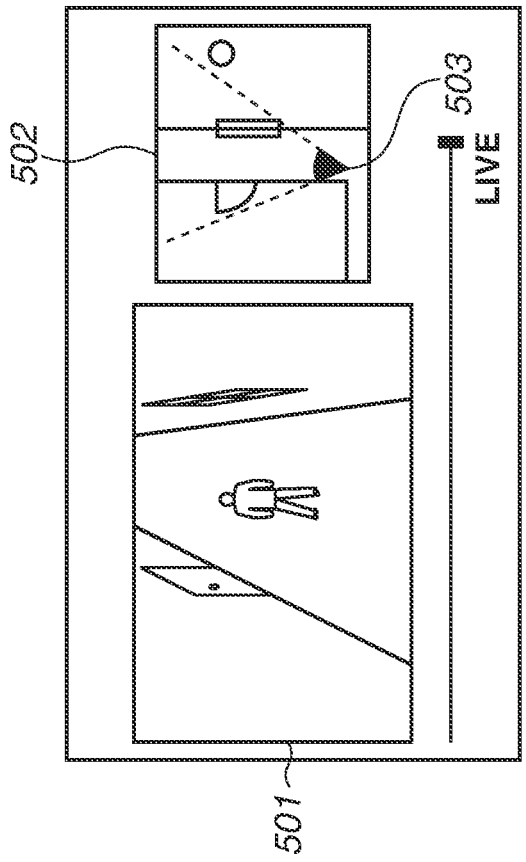

FIG. 5B is a diagram illustrating a screen display example of the display unit 409 to be displayed when an abnormality happens to a person detected as a detection target. For example, the detection unit 402 detects that a person 504 detected in the camera video 501 is exhibiting an abnormal behavior such as falling unconscious. Upon receiving a detection result of such an abnormal behavior, the display unit 409 performs an alarm display 505 as a pop-up display, for example, to notify the user that an abnormality has happened to the person. In addition, the display unit 409 displays a marker 506 indicating a position at which the abnormality is detected on the top view map 502.

In addition, the warning of the abnormality occurrence illustrated in the drawing is an example, and a display method is not limited to such a display method. As a method for notifying a warning when an abnormality occurs, for example, when the terminal device 308 includes a speaker, a warning sound may be emitted from the speaker, or a notification method of transmitting a warning message to another external terminal device may be combined therewith.

In installing a monitoring camera in a monitoring system that performs the above-described detection, the user installs a camera at a point at which the occurrence of an abnormality is desired to be detected. It is, thus, desirable for the user that a monitoring camera is installed in such a manner that one monitoring camera can detect a detection target from a monitorable range as wide as possible. However, it is not always desirable that a detection target is detected from the entire range in which the monitoring camera performs image capturing. For example, if a person who appears outside a window within an imaging range of the monitoring camera, or a person drawn on a poster attached to a wall surface is detected, the detected person can possibly be detected as a person who performs an abnormal behavior, and an erroneous warning can possibly be generated. Such erroneous detection and waning generation are not beneficial for the user, it is accordingly desirable to exclude such a person who appears outside the window or a person drawn on a poster attached to the wall surface, from a detection target. Moreover, it is desirable not to perform detection in a region which is identified in advance as a region where detection processing with high reliability is highly likely to be difficult. For example, when a person in a video captured by a monitoring camera is located far away and the person in the video is too small, or when a head portion of a person falls outside a viewing angle of a monitoring camera, it is difficult to perform detection processing with high reliability.

Thus, the information processing apparatus according to the present exemplary embodiment has a function that allows setting of a detection region in which detection processing is to be execute, in a video captured by the monitoring camera of the imaging unit 401. In addition, in the present exemplary embodiment, the user can designate a partial region in a video captured by the imaging unit 401, as a desired detection region. As described above, the desired detection region is identified by the desired condition acquisition unit 404 based on a desired detection condition designated by the user. The desired detection region may be the entire region of a video captured by the monitoring camera. In addition, as described above, a detection region in which the detection unit 402 executes detection processing of a detection target is determined based on a desired detection region, and a detectable region determined based on at least one imaging condition.

In the present exemplary embodiment, for example, a floor surface in a range in which a detection target person is expected to walk is designated by the user as a desired detection condition, the desired condition acquisition unit 404 identifies the region of the floor surface as a desired detection region.

Figure 5C:
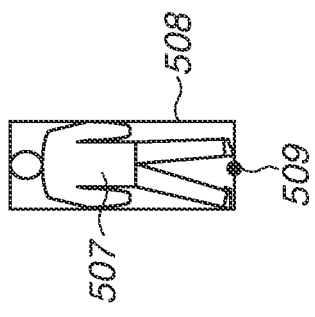

In addition, in the present exemplary embodiment, a person is used as a detection target. Thus, the detection unit 402 determines whether a detection target person exists in a detection region, based on a position estimated to correspond to the person's feet in a state in which the person is in the upright position. FIG. 5C is a diagram illustrating a person 507 as a detection target in the camera video 501 illustrated in FIG. 5A. The detection unit 402 defines a center point (reference point) 509 of a lower side of a circumscribed rectangle 508 having sides parallel to the outer sides of the screen in which the person 507 appears in the camera video 501, as a reference point of the person. Then, only when the reference point 509 defined for the person 507 is included in the detection region, the detection unit 402 performs detection processing of an abnormal behavior of the person 507.

The method for determining whether a detection target exists in a detection region is an example, and the detection unit 402 may appropriately select a reference point to be used, in accordance with the characteristics of a detection target. For example, the detection unit 402 may select, as a reference point, the center of the face or the center of the body of a person instead of the feet of the person. In addition, for example, when a detection target is an automobile, the detection unit 402 may select the center of a windshield or the center of ground contact points of front and rear tires, as a reference point. In a case where not only a reference point but also the entire circumscribed rectangle surrounding a detection target are encompassed in a detection region, the detection unit 402 may determine that the detection target exists in the detection region.

Hereinafter, an example of a video to be displayed on the screen of the display unit 409 and an example of an operation to be performed by the user until a detection region in which a detection target is to be detected is determined will be described with reference to FIGS. 6A to 6E.

Figure 6A:
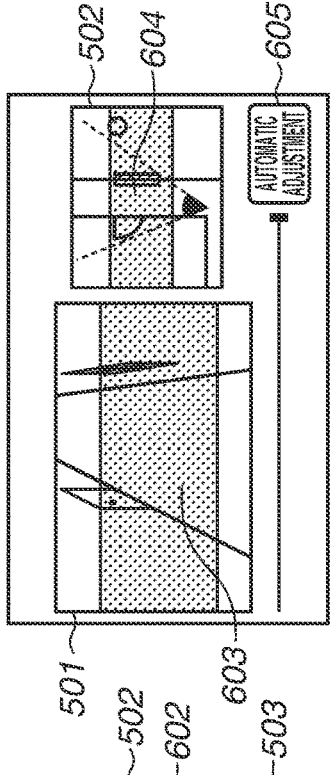
FIGS. 6A to 6E are diagrams each illustrating an example of a display screen in a default setting according to the first exemplary embodiment.

FIG. 6A is a diagram illustrating an example of a screen to be displayed on the display unit 409 when a desired detection condition is designated by the user and a desired detection region is identified. In the present exemplary embodiment, the designation of a desired detection condition is performed by the user by the designation of an image region on the screen of the display unit 409. As a designation method of a desired detection condition, for example, a method of instructing a desired image region in the camera video 501 is considered. In the example illustrated in FIG. 6A, for example, an image region of a part of a passage way in the camera video 501 is instructed by the user as a desired detection condition. At this time, the desired condition acquisition unit 404 identifies a region having the same feature as the image region designated by the user, as a desired detection region. In the example illustrated in FIG. 6B, an image region of a part of a passage way in the camera video 501 is designated as a desired detection condition. The desired condition acquisition unit 404 identifies the entire region of the passage way in FIG. 6A, which is a region having the same feature as the image region designated by the user, as a desired detection region 601. At this time, the display unit 409 displays the identified desired detection region 601 so as to be identifiable by the user, by performing predetermined coloring in the camera video 501, for example.

If the desired detection region is identified by the desired condition acquisition unit 404, the display unit 409 also displays, on the top view map 502, a desired detection region 602 in which predetermined coloring, for example, is performed so as to correspond to the desired detection region 601 in the camera video 501. The details of the processing in which a desired detection condition is designated by the user and a desired detection region is identified will be described with reference to step S702 in a flowchart illustrated in FIG. 7, which will be described below.

Figure 6B:
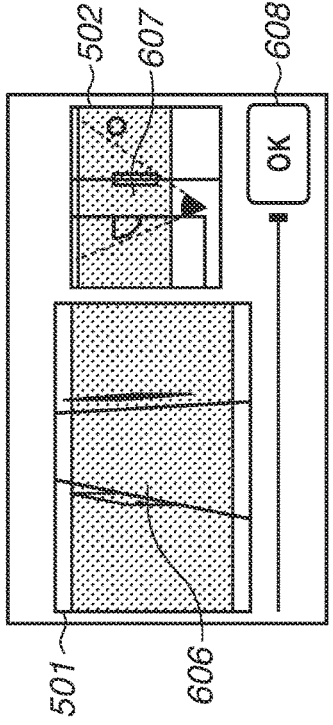
Figure 6C:
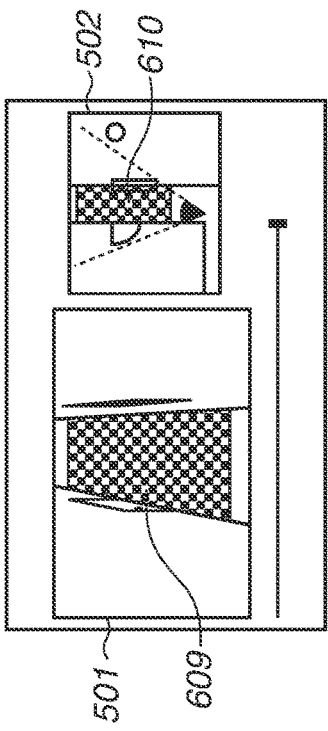

FIGS. 6B and 6C are diagrams illustrating an example of a video to be displayed on the screen of the display unit 409 and an example of an operation to be performed by the user until a detectable region is determined by the region determination unit 403 after a desired detection region is identified as described above.

If the desired detection region is identified as described above, the region determination unit 403 obtains a detectable region in which a detection target is detectable in a current camera setting, by calculation. Then, the display unit 409 displays the detectable region on the camera video 501 and the top view map 502. In the example illustrated in FIG. 6B, an example in a state in which a detectable region 603 is displayed on the camera video 501, and a detectable region 604 is displayed on the top view map 502 is illustrated. A method of calculating the detectable region by the region determination unit 403 will be described with reference to step S704 in the flowchart illustrated in FIG. 7, which will be described below.

In the present exemplary embodiment, the detectable region calculated by the region determination unit 403 is adjustable by the user. For example, the user is assumed to press an automatic adjustment button 605 if the user considers that the detectable region 603 in FIG. 6B is insufficient. In this case, the detection condition determination unit 405 sets various imaging conditions by automatically changing pan, tilt, and zoom settings of the monitoring camera of the imaging unit 401 via the imaging management unit 406 and the camera control unit 407. Then, the region determination unit 403 recalculates a detectable region for each of these various imaging conditions, and the display unit 409 displays the recalculated detectable regions. FIG. 6C illustrates an example in which a detectable region 606 on the camera video 501 and a detectable region 607 on the top view map 502 are displayed. The detectable regions 606 and 607 are changed regions based on changes of the imaging conditions and recalculation of the detectable regions. In addition, the example in FIG. 6C illustrates an example to be displayed when an imaging condition for setting a wider viewing angle than a viewing angle set by the imaging condition under which the detectable regions illustrated in FIG. 6B are calculated is searched for, and new detectable regions are recalculated in accordance with the setting of the found imaging condition. In addition, the details of the method of searching for an imaging condition will be described below with reference to the flowchart in FIG. 7.

Figure 6D:
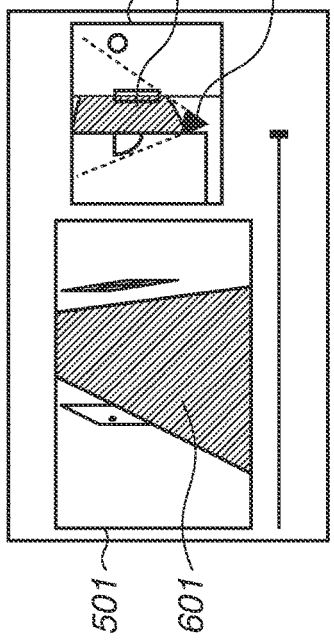

FIG. 6D is a diagram illustrating a detection region finally determined after the above-described adjustment is performed. For example, if the user agrees with the setting of the imaging condition under which the detectable regions in FIG. 6C are calculated, the detection condition determination unit 405 obtains a shared portion of the detectable region 607 and the desired detection region 602 on the top view map 502, and determines a final detection region 610 as illustrated in FIG. 6D. At this time, the display unit 409 displays the determined detection region 610 on the top view map 502, and also displays a similar detection region 609 on the camera video 501. Then, the detection condition determination unit 405 adds a condition for performing detection processing only on an object appearing within the range of the detection region 609, to a detection condition.

Figure 6E:
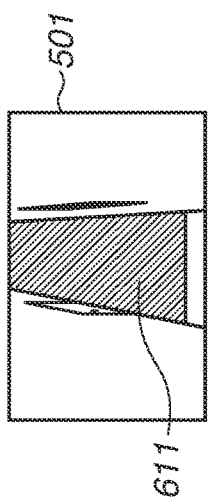

In the above description, a detection region is obtained based on the top view map 502, but a detection region may be obtained based on a region in the camera video 501 instead of the top view map 502. FIG. 6E is a diagram illustrating an example to be displayed when a detection region is obtained based on a region in the camera video 501. In this example, first of all, the detection condition determination unit 405 obtains a desired detection region 611 in the camera video 501 as illustrated in FIG. 6E, by performing projection transform of the desired detection region 602 on the top view map 502 based on the camera setting set in FIG. 6C. Then, the detection condition determination unit 405 obtains the detection region 610 on the top view map 502 by extracting a shared portion of the desired detection region 611 and the detectable region 606, and performing projection transform of the detection region 609 on the camera video 501.

As described above, the information processing apparatus according to the present exemplary embodiment identifies a desired detection region based on a desired detection condition designated by the user, and further sets a detection condition expected to obtain as large number of detection results as possible, based on the desired detection region and a detectable region determined based on an imaging condition. In other words, according to the present exemplary embodiment, a detection condition can be set without user's special knowledge.

Figure 7:
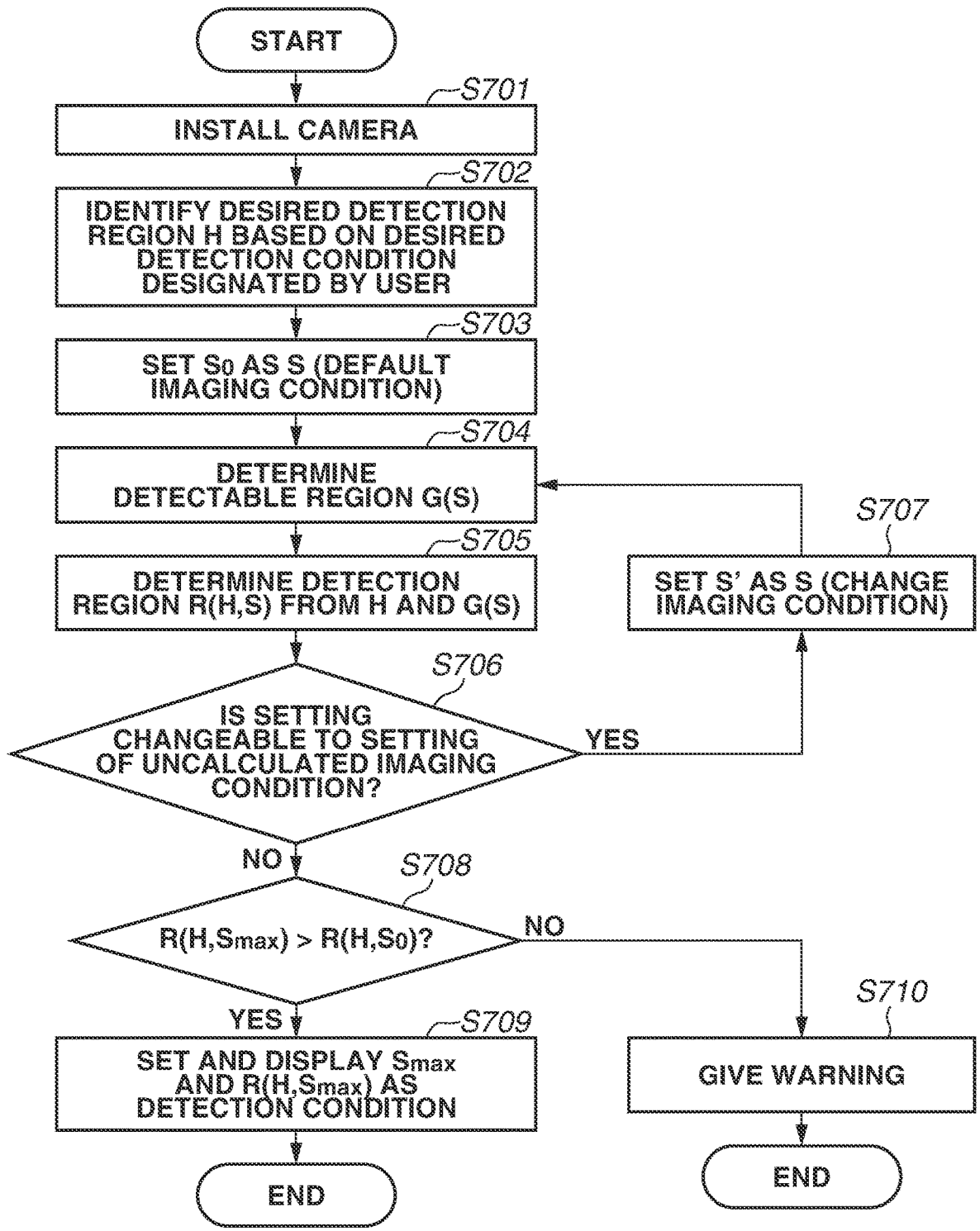
FIG. 7 is a flowchart illustrating a processing procedure according to the first exemplary embodiment.

Next, the above-described operation will be described with reference to the flowchart in FIG. 7. The processing in the flowchart in FIG. 7 is executed by the information processing apparatus according to the present exemplary embodiment when a monitoring camera is installed. The description will be given using an example case where a monitoring camera is newly installed, but similar procedures can be used also when the setting of an existing monitoring camera is changed or resetting of a monitoring camera is performed in accordance with a change in situation such as imaging location.

First of all, in step S701, when the monitoring camera of the imaging unit 401 is installed by the user, the imaging management unit 406 registers the installed camera. The imaging management unit 406 records, as current imaging conditions, an installation height of the camera, a parameter value of pan, tilt, or zoom, and an installation position of the camera on a top view map.

Next, in step S702, the desired condition acquisition unit 404 displays a desired detection region designation screen on the display unit 409, and prompts the user to designate a desired detection condition. Then, a desired detection condition is designated by the user via the operation unit 410, and furthermore, an operation indicating that the designation of the condition has been completed is input from the user. At this time, the desired condition acquisition unit 404 identifies a desired detection region based on the desired detection condition designated by the user, and records information regarding the identified desired detection region.

FIGS. 8A to 8C are explanatory diagrams illustrating an example of a screen to be displayed until a desired detection condition is designated and a desired detection region is identified in step S702.

FIG. 8A is a diagram illustrating an example of a designation screen to be displayed when a desired detection condition is designated. On the desired detection condition designation screen illustrated in FIG. 8A, a camera video 801 captured by the installed monitoring camera, a top view map 802, a toolbox 803, and buttons 806, 807, and 812 are displayed.

A figure 813 desired to be drawn is selected by the user from the toolbox 803 via the operation unit 410, and furthermore, the selected figure 813 is arranged at a desired position on the camera video 801 or the top view map 802. Such an operation of selecting a figure from the toolbox 803, and an operation of arranging the selected figure at a desired position on the camera video 801 or the top view map 802 may be each performed once or a plurality of times. In addition, a figured to be selected may be changed every time. The toolbox 803 includes icons for drawing figures such as a straight line, a freehand curved line, an arbitrary polygonal shape, a rectangle, a trapezoid, a triangle, an ellipse, and a sector form, and an eraser tool for partially erasing a figure. These figures and tools are examples, and figures that can be drawn are not limited.

At this time, the desired condition acquisition unit 404 displays, on the display unit 409, the figure selected in the above-described manner, so as to be superimposed on the camera video 801 or the top view map 802. In the example illustrated in FIG. 8A, the selected figure is semi-transparently drawn as a figure 804 on the camera video 801 and, in a similar manner, semi-transparently drawn as a figure 805 on the top view map 802. In addition, projection transform of the figure 804 on the camera video 801 and the FIG. 805 on the top view map 802 is performed with respect to each other based on an imaging condition of the monitoring camera, and when the figure selected by the user is changed, for example, the shapes are updated in a synchronized manner each time the selected figure is changed.

In addition, on the designation screen for desired detection condition designation, the button 806 is prepared for aiding designation of a desired detection condition on the camera video 801. If the button 806 is pressed by the user via the operation unit 410, the desired condition acquisition unit 404 divides a region in the camera video 801 by a known method such as a watershed algorithm discussed in SHAFARENKO, Leila; PETROU, Maria; KITTLER, Josef. Automatic watershed segmentation of randomly textured color images. IEEE transactions on Image Processing, 1997, 6,11: 1530-1544.

FIG. 8B is a diagram illustrating an example of a camera video 808 in which region division is performed. If the region of the camera video is divided into regions, the desired condition acquisition unit 404 displays divided regions each color coded via the display unit 409, as indicated in the camera video 808 in FIG. 8B. If the user selects a desired divided region via the operation unit 410, the desired condition acquisition unit 404 draws the same figure as a selected divided region 809 via the display unit 409. In addition, FIG. 8B illustrates an example in which a floor portion of a passage way is selected as a divided region.

In the present exemplary embodiment, on the screen for designating a desired detection condition, the button 807 as illustrated in FIG. 8A is also prepared for aiding the designation of a divided region on the top view map 802. If the button 807 is pressed by the user via the operation unit 410, the desired condition acquisition unit 404 displays a list box 810 as illustrated in FIG. 8C, via the display unit 409. In the list box 810, section names of the building that have been created in advance from the design drawing are displayed. FIG. 8C is a diagram illustrating an example of the list box 810 to be displayed on the screen when the button 807 is pressed, and an example to be displayed when a desired section name is selected from the list box 810. Then, if the user selects a desired section name from among the list box 810 using the operation unit 410, the desired condition acquisition unit 404 draws a region 811 having a shape matching the corresponding section on the top view map 802, via the display unit 409. FIG. 8C illustrates a display example in which a section name "passage way in front of a conference room 1" where a monitoring camera is installed is selected from the list box 810, and the region 811 corresponding to the section is drawn in a color-coded state on the top view map 802.

In a case where the above-described button 806 or button 807 is used, figures drawn in corresponding regions in the camera video 801 and the top view map 802 are updated in a synchronized manner. In a case where the toolbox 803 is further operated by the user via the operation unit 410 after these functions are used, a figure is corrected by the desired condition acquisition unit 404 in accordance with the operation.

On the designation screen for desired detection condition designation, there is also an OK button 812 prepared for the user to press when the above-described operation of selecting and drawing a figure is completed. If the selection and drawing operation of the figure is completed and the user presses the OK button 812 via the operation unit 410, the desired condition acquisition unit 404 identifies a region designated by the drawn figure, as a desired detection region.

After a desired detection region is identified based on the designation of the user in the above-described manner, the desired condition acquisition unit 404 stores information regarding; the identified desired detection region. The description will return to the flowchart illustrated in FIG. 7. After step S702, the processing of the information processing apparatus proceeds to step S703.

In step S703, the detection condition determination unit 405 acquires a current imaging condition So from the imaging management unit 406, and sets the acquired current imaging condition So as an imaging condition S.

Next, in step S704, the region determination unit 403 determines a detectable region G(S) based on the imaging condition S. The detectable region G(S) is a region in which a detection target is estimated to be detectable by the detection unit 402 with reliable accuracy under the imaging condition S. In the present exemplary embodiment, a state in which the entire detection target is included in a camera video and a state in which the detection target has an enough size in the camera video are used as conditions under which the detection unit 402 can detect a detection target with reliable accuracy. For example, if a head portion or a leg portion of a person is cut off in the camera video, or a captured image of a person is small because the person is located far away from the monitoring camera, there is a concern that the accuracy declines. A detectable region is therefore intended to be determined as a region in which a person is estimated to have an enough size and to be fully included in a camera video. Thus, if the entire detection target is included in a camera video and the detection target has an enough size in the camera video, the region determination unit 403 determines that the detection unit 402 can detect a detection target with reliable accuracy.

Hereinafter, a method by which the region determination unit 403 determines a detectable region using an approximation formula that is based on an installation height and an imaging angle of a monitoring camera that are included in the imaging condition S will be described with reference to FIGS. 9A to 9C. In this example, a detectable region is obtained on a top view map, and a detectable region on a camera video is obtained by performing projection transform of the region on the top view map.

FIG. 9A is a schematic diagram illustrating an installation height h of a camera, a vertical line from the camera to a floor surface, and a top surface tilt angle θ and a bottom surface tilt angle φ of a viewing angle of the camera. In FIG. 9A, the floor surface is assumed to be a horizontal surface, and the installation height h of the camera, the vertical line from the camera to the floor surface, and the top surface tilt angle θ and the bottom surface tilt angle φ of the viewing angle are known from the camera settings. The top surface tilt angle θ and the bottom surface tilt angle φ are defined based on setting values of a tilt angle and zoom of the camera. In FIG. 9A, an imaging focal point of the camera is denoted by "O", and a lower end of a vertical line extending from the imaging focal point of the camera to the floor surface is denoted by "R0".

FIG. 9B is a schematic top view centered on a camera position on a top view map. As illustrated in FIG. 9B, if an arc R with a radius r is drawn around the camera position on the top view map, a distance between the circumference on the floor surface and the imaging focal point of the camera can be represented as $\sqrt{(r^2+h^2)}$. If a radius of an arc R1 drawn by a lower side of the viewing angle is denoted by "$r_1$", and a radius of an arc R2 drawn by an upper side of the viewing angle is denoted by "$r_2$", the radius $r_1$ is obtained as $r_1 = h(\tan \varphi)$ and the radius $r_2$ is obtained as $r_2 = h(\tan \theta)$.

FIG. 9C is a schematic diagram illustrating a camera video. In FIG. 9C, when no obstacle is assumed to exist, straight lines obtained by projecting arcs drawn on the floor surface are drawn parallel on the upper and lower sides. In FIG. 9C, a straight line corresponding to the arc R is denoted by "B", and a width between the straight line B and the upper side is denoted by "b". In particular, the upper side corresponds to the straight line obtained by projecting the arc R2, and the lower side corresponds to the straight line obtained by projecting the arc R1. A person is standing on the straight line B, and a height of the person in the camera video is denoted by "t".

At this time, a size of an image in the camera video becomes smaller in inverse proportion to a horizontal distance from the camera, and a relationship represented by Formula (1) is satisfied for the following value L. In Formula (1), "H" denotes a height of a camera video, and the value L is a value obtained by representing, in the same unit as "H", a height from an arc R0 on the camera video to the lower side when a line from the lower side of the camera video to the arc R0 is virtually extended.

$$r:r_2=(L+H-b):(L+H) \quad (1)$$

In addition, a relationship similar to the relationship represented by Formula (1) is satisfied also for the upper side and the lower side of the camera video as in Formula (2).

$$r_1:r_2=L:(L+H) \quad (2)$$

Furthermore, if Formulae (1) and (2) are simultaneously solved for "r", Formula (3) is obtained.

$$r=r_2-\{(r_2-r_1)/H\}\cdot b \quad (3)$$

Because a size of an image in the camera video becomes smaller in inverse proportion to a horizontal distance from the camera, the height t of the person who has a standard height T and is standing on the arc R in the camera video can be represented as $t=CT/r$ using an appropriate coefficient C. In addition, a condition under which the image of the person does not fall outside the video is expressed by $t<b<H$. When the minimum value of the height of a detectable person is denoted by "U", a condition under which the image of the person has a detectable size is expressed by $t<U$. Based on the definition of "b", $b>0$ is naturally satisfied.

Then, if "t" and "r" are erased from $t<b$ and $t<U$ and the formulae are solved for "b" and organized, Formula (4) is obtained. In other words, this is a condition under which the image of the person standing on the straight line B is detectable in the camera video.

$$\begin{cases} \dfrac{r_2^2 - \sqrt{r_2^2 - 4CT(r_2 - r_1)}}{2(r_2 - r_1)} < b < \dfrac{r_2^2 + \sqrt{r_2^2 - 4CT(r_2 - r_1)}}{2(r_2 - r_1)} \\ 0 < b < \min\left(H, \dfrac{Ur_2 - CT}{U(r_2 - r_1)}H\right) \end{cases} \quad (4)$$

In Formula (4), a first inequation corresponds to $t<b$ and a second inequation corresponds to $t<U$. The range of "b" satisfying both the inequations in Formula (4) corresponds to a detectable region. In addition, if a value inside a root sign of the first inequation in Formula (4) is a negative value, or if "b" satisfying Formula (4) does not exist, a detectable region is determined to be "none". A height T, e.g., an average height of Japanese, is appropriately defined in accordance with an installation condition of the camera. The coefficient C and the maximum value U of the height of the person are obtained and set in advance by a manufacturer of the apparatus. The description will return to the flowchart illustrated in FIG. 7. After step S704, the processing of the information processing apparatus proceeds to step S705. In step S705, a detection region R(H,S) is calculated from the desired detection region H and the detectable region G(S).

Next, in step S706, the detection condition determination unit 405 determines whether an imaging condition can be changed to an imaging condition for which the detection region R(H,S) has not been calculated yet in step S705 in this flow. If the detection condition determination unit 405 determines that there is an imaging condition for which the detection region R(H,S) has not been calculated yet (YES in step S706), the processing proceeds to step S707. In step S707, the setting of a new imaging condition is selected. If the detection condition determination unit 405 determines that there is no imaging condition for which the detection region R(H,S) has not been calculated yet (NO in step S706), the processing proceeds to step S708.

In the present exemplary embodiment, as setting values of pan, tilt, and zoom that are included in the imaging condition, for example, a setting value of pan can be set to any angle in steps of five angles from −60 degrees to 60 degrees, a setting value of tilt can be set to any angle in steps of three angles from 0 degree to 30 degrees, and a setting value of zoom can be set to any value in steps of equal ratio of 2× from 0.25× to 8×. A range to be searched for as an imaging condition in this flow is a set of possible combinations of these.

The detection condition determination unit 405 holds a table for checking whether calculation has been performed for each of these combinations, and also holds a table in which only cells with settings corresponding to the imaging condition So as default values are checked.

Then, in step S707, the detection condition determination unit 405 selects a new imaging condition S' different from the current imaging condition S, for which the detection region R(H,S) has not been calculated yet in step S705 in this flow. Then, the detection condition determination unit 405 checks the cells with settings corresponding to the imaging condition S' in the table, and the imaging management unit 406 changes the state of the imaging unit 401 in accordance with the imaging condition S' via the camera control unit 407, and sets the imaging condition S' as a new imaging condition S. After step S707, the processing of the information processing apparatus returns to step S704.

The detection condition determination unit 405 selects the imaging condition S' by searching for unchecked cells in the above-described table, and causes a camera setting close to the imaging condition $S_0$ to be preferentially selected, using a known method such as a Z-order curve range query discussed in LAWDER, Jonathan K.; KING, Peter J., H. Querying multi-dimensional data indexed using the Hilbert space-filling curve, ACM Sigmod Record, 2001, 30.1: 19-24.

A search method is not limited to this. For example, the detection condition determination unit 405 may obtain an area of the detection region R(H,S) in sample cells selected at random instead of full search, and estimate a setting at which the area becomes largest by interpolating samples. For example, the detection condition determination unit 405 also may add processing of detecting the tendency of a detection region getting smaller as extremely departing from the imaging condition So, and stopping the search at an early stage if it is determined that an adequate detection region cannot be obtained.

Next, in step S708, the detection condition determination unit 405 acquires an imaging condition $S_{max}$ under which an area in the top view map has the maximum value, and an area of a detection region $R(H,S_{max})$ corresponding thereto. Then, the detection condition determination unit 405 compares the area of the detection region $R(H,S_{max})$ and the area of the detection region $R(H,S_0)$ under the default imaging condition So. If the area of the detection region $R(H,S_{max})$ is larger (YES in step S708), the processing proceeds to step S709. In step S709, the detection condition determination unit 405 determines the imaging condition $S_{max}$ and the detection region R(H,S$_{max}$) as a detection condition, and ends this flow. On the other hand, if the area of the detection region R(H,S$_0$) is larger (NO in step S708), the processing of the information processing apparatus proceeds to step S710. At this time, in step S710, the display unit 409 gives the user a warning indicating that a detection condition better than a default condition cannot be found, and this flow is ended.

Instead of simply comparing the areas, the detection condition determination unit 405 may prioritize an imaging condition initially set by the user and determine not to change a detection condition, if the area of the detection region R(H,S$_{max}$) does not exceed 101 times of the area of the detection region R(H,S$_0$).

According to the first exemplary embodiment, by searching for the range of an imaging condition under which a detection target is detectable, and then, selecting an imaging condition with a sufficient detection region, that is to say, a detectable region desirably including a desired detection region, it is possible to determine a detection condition including an effective detection region. Then, according to the first exemplary embodiment, it is possible to easily present a state in which a desired detection region of the user and a detectable region of a monitoring camera efficiently overlap each other, without the user's special knowledge. With this configuration, according to the first exemplary embodiment, it is possible to contribute to the efficient arrangement of a camera.

In the first exemplary embodiment, the description has been given of a method of estimating whether a region is a region in which a detection target is detectable based on an imaging condition of a monitoring camera. Nevertheless, if, for example, there is complicated unevenness on the floor surface or if a portion with a large fluctuation in environmental condition such as an illumination condition is included in the same video, it is sometimes difficult to accurately estimate whether a region is a region in which a detection target is detectable. In addition, if the illumination condition contributes to detection accuracy, adjustment is desirably performed on the illumination condition as an imaging condition.

In view of the foregoing, in a second exemplary embodiment, the description will be given of a method of determining a detection region by acquiring statistical information using a video captured by a monitoring camera in advance, and estimating a detectable region based on the statistical information. In the second exemplary embodiment, parts added to the first exemplary embodiment or changed from the first exemplary embodiment will be described, and the descriptions of parts similar to the first exemplary embodiment will be omitted.

A method for setting a detection region in the second exemplary embodiment will be described with reference to FIGS. 10A to 10C.

Figure 10A:
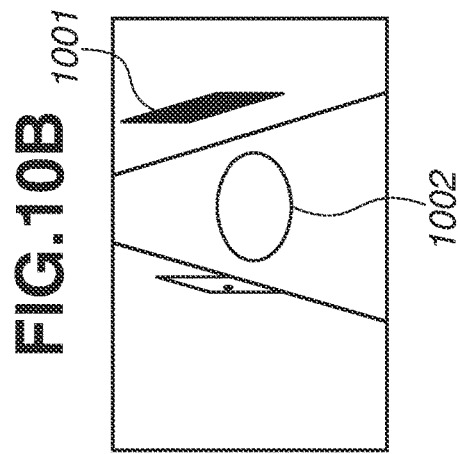
FIGS. 10A, 10B and 10C are diagrams each illustrating an example of a display screen in a default setting according to a second exemplary embodiment.
Figure 10B:
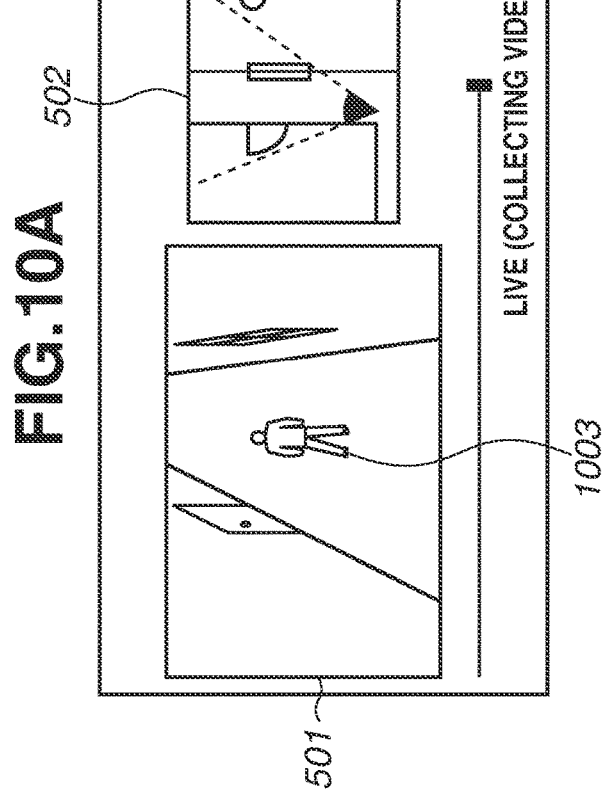

FIG. 10A is a diagram illustrating a display example of the camera video 501 captured by a monitoring camera and the top view map 502.

In the second exemplary embodiment, if a camera is installed by the user, image capturing, for example, is performed by the camera for one day, and a video for analysis is collected. While capturing the video for analysis, a camera video can be monitored as illustrated in FIG. 10A, but detection processing has not been operated yet. In addition, while the analysis video is being collected, image capturing is performed by sequentially changing the setting of the imaging condition.

In addition, while collecting the video for analysis, in addition to changing the setting of the camera as an imaging condition, an environmental condition such as an illumination condition is also changed. FIG. 10B is a diagram illustrating a variation example of an illumination condition. For example, as illustrated in FIG. 10B, a variation of an illumination condition that is caused by opening or closing a blind 1001 on a window, or the adjustment of an opened/closed amount, and a variation of an illumination condition that is caused by changing a light amount on a floor surface 1002 by adjusting a light amount of a ceiling illumination are performed together with the camera setting. Furthermore, using the collected analysis videos, the information processing apparatus detects a person 1003 by human body detection, and stores a position where the person appears and a size of the person.

Figure 10C:
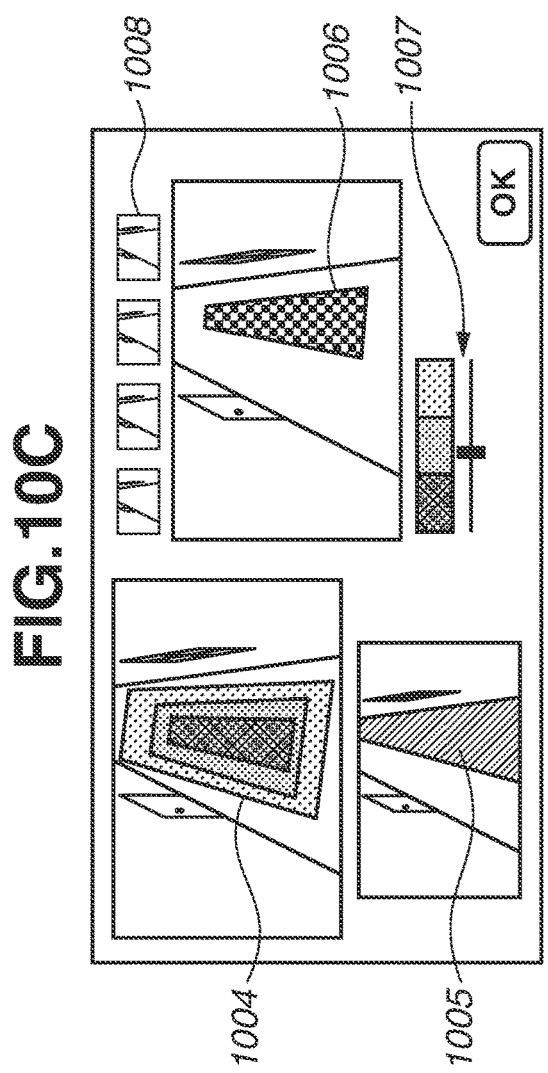

In the second exemplary embodiment, after the completion of the above-described processing such as the collection of analysis videos and human body detection, a detection region is determined using a screen as illustrated in FIG. 10C. A detectable region 1004 in the second exemplary embodiment is represented by a heat map that expresses detectability in numerical values from 0 to 1, and is determined based on information regarding a person detected from the collected analysis videos as described above. Then, in the second exemplary embodiment, a detection region 1006 is determined based on the detectable region 1004 and a desired detection region 1005 identified based on the designation of the user and displayed. In other words, in the second exemplary embodiment, the detection region 1006 is determined and presented as a shared portion of the detectable region 1004 that is a portion in which detectability of a person is higher than a fixed threshold, and the desired detection region 1005 identified based on the designation of the user.

In the second exemplary embodiment, a slide bar 1007 is prepared in the screen as illustrated in FIG. 10C. The slide bar 1007 is prepared for the user to set a threshold of detectability. The user can change the threshold by moving the slide bar 1007 and make a trade-off between the accuracy of detection and a detection range. In the second exemplary embodiment, a plurality of videos 1008 corresponding to various imaging conditions set in collecting analysis videos is displayed on the screen and made selectable. The user can select a video corresponding to a desired imaging condition, from among the plurality of videos 1008, and the detection condition determination unit 405 can thereby select a detection region suitable for the imaging condition.

In the second exemplary embodiment, an imaging condition and a detection region are determined in the above-described manner, and the imaging condition and the detection region are used as a detection condition in subsequent detection. In this manner, in the second exemplary embodiment, it is possible to determine detectability based on a video actually captured by a monitoring camera.

An operation flow for implementing the above-described operations in the second exemplary embodiment will be described with reference to FIG. 11.

Figure 11:
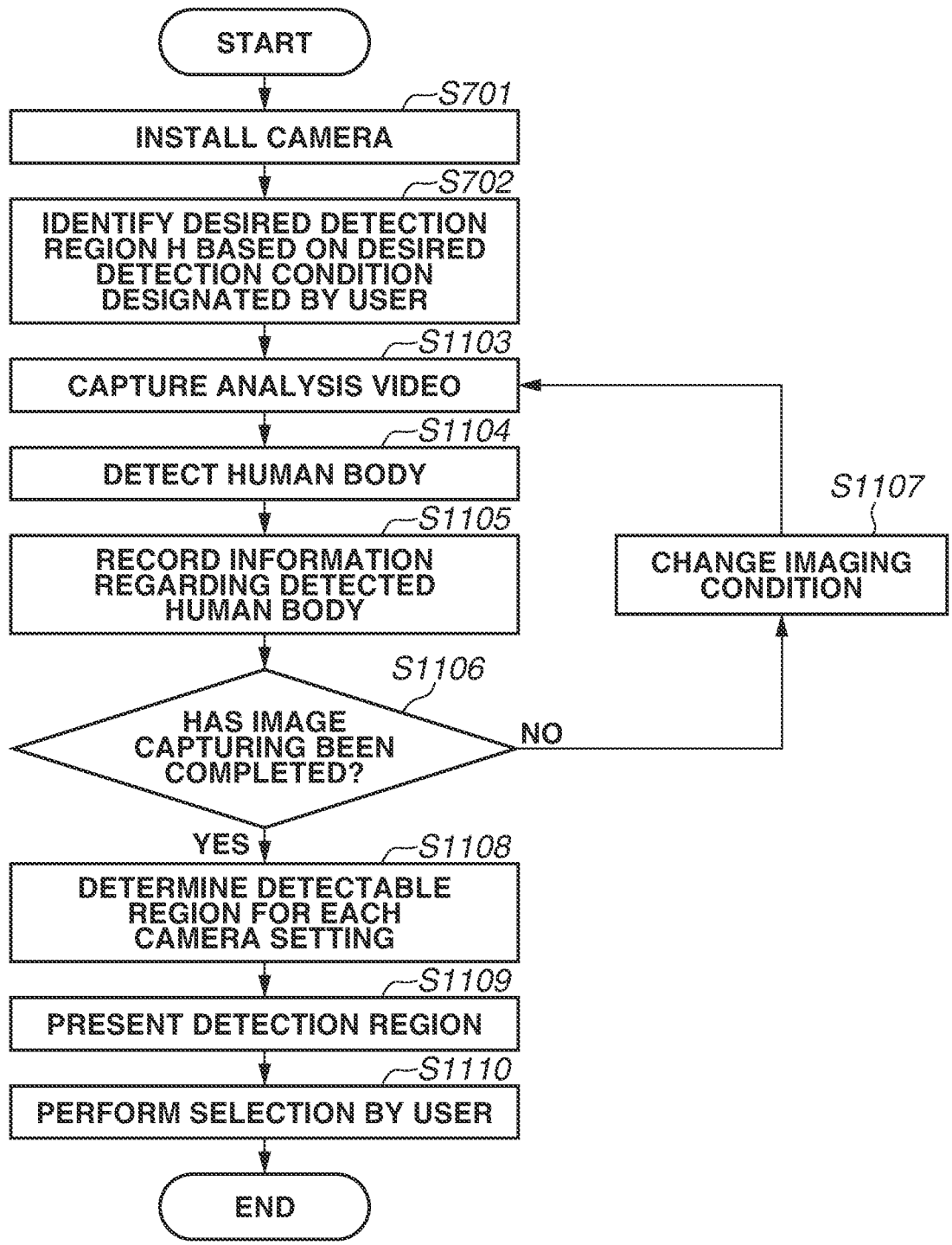
FIG. 11 is a flowchart illustrating a processing procedure according to the second exemplary embodiment.

Steps S701 and S702 in FIG. 11 are processing steps similar to those in the first exemplary embodiment that are illustrated in FIG. 7, but in the second exemplary embodiment, the imaging management unit 406 also acquires an illumination condition such as an illumination state of an imaging location and the state of a blind on a window as an imaging condition in step S701. After step S702, the processing proceeds to step S1103.

In step S1103, a video for analysis is captured, for example, for 30 minutes under the control of the imaging unit 401 and the camera control unit 407, and the captured video for analysis is recorded in the storage unit 408.

Next, in step S1104, the detection condition determination unit 405 detects a human body from the video for analysis captured and recorded in step S1103.

Next, in step S1105, the detection condition determination unit 405 records information regarding a person detected from the video for analysis in step S1104, in the storage unit 408. At this time, the information recorded in the storage unit 408 includes information regarding a position and a size of the person in the camera video. The recorded information is separately recorded for each current imaging condition, and is prevented from being mixed with information to be recorded when processing in step S1105 is subsequently executed using another imaging condition.

Next, in step S1106, the detection condition determination unit 405 determines whether image capturing has been completed for all sets of predefined imaging conditions. If the image capturing has not been completed (NO in step S1106), the processing proceeds to step S1107. If the image capturing has been completed (YES in step S1106), the processing proceeds to step S1108.

In step S1107, the detection condition determination unit 405 selects an imaging condition for which image capturing has not been performed yet, similarly to the processing in step S709 in the first exemplary embodiment, and reflects the imaging condition in the imaging management unit 406. Then, the processing returns to step S1103. In the second exemplary embodiment, the imaging condition also includes the above-described illumination conditions that are based on the state of an illumination and the blind on the window, in addition to the imaging condition of the monitoring camera, and these illumination conditions are also selected.

In step S1108, the region determination unit 403 obtains a detectability distribution for each imaging condition recorded in step S1105 and determines a detectable region using the detectability distribution.

FIG. 12 is a diagram illustrating a determination method of a detectable region that is used by the region determination unit 403 in the second exemplary embodiment.

First of all, the region determination unit 403 calculates a numerical value of detectability lip for each person image P appearing in a video for analysis 1201. Then, the region determination unit 403 plots the value of the detectability $V_P$ that has been obtained by calculation, at a position 1202 of a representative point representing the person image P.

At this time, the region determination unit 403 obtains the detectability $V_P$ based on an index value such as a size, an aspect ratio, an average luminance value, or an image sharpness degree of the person image P, or a probability score of human body detection. For example, a table of detection accuracy of the detection unit 402 that has been evaluated in advance by a manufacturer of the apparatus for each index value is stored, and the region determination unit 403 obtains the detectability $V_P$ by reference to the table. Alternatively, an approximated curve is obtained from the table using a polynomial and the obtained approximated curve is stored. The region determination unit 403 obtains the detectability $V_P$ by substituting each index value into a formula of the approximated curve. The range of value of the detectability $V_P$ is 0 to 1, and the larger the numerical value is, the higher the detectability is. The representative point is a center point of the lower side of a circumscribed rectangle, for example.

Then, the region determination unit 403 plots detectability as illustrated in a plot example 1204 for a person image included in all frames of a video captured under the imaging condition S. Then, in the example illustrated in FIG. 12, a detectability distribution $D_S$ as indicated as a region 1205 is estimated as a plot result of detectability.

The detectability distribution $D_S$ is a distribution represented by a mixture gaussian distribution (Gaussian Mixture Model: GMM), for example, and a known method such as an expectation-maximization (EM) algorithm can be used for the estimation of a detectability distribution. If a certain threshold T is defined, the region determination unit 403 can define a region 1206 in which the value of detectability distribution $D_S$ becomes a value $D_S(T)$ equal to or larger than the threshold T. A value preset by the user is used as the threshold T. In step S1109 to be described below, the region determination unit 403 uses a region $D_S(T)$ defined from the detectability distribution $D_S$ and the threshold I, as a detectable region.

Then, after the region determination unit 403 calculates a detectability distribution for each of the imaging conditions recorded in step S1105, the processing proceeds to step S1109.

In step S1109, the detection condition determination unit 405 obtains the detectable region $D_S(T)$ for each of the imaging conditions S recorded in step S1105, and determines a detection region from a portion shared with a desired detection region. Then, the detection condition determination unit 405 selects a region in which an area on the top view map becomes largest, and displays the selected region on the display unit 409.

In displaying a detectable region on the display unit 409, instead of displaying the detectable region $D_S(T)$, the detectability distribution $D_S$ may be displayed as a heat map represented by different color shades and phases, for example.

Next, in step S1110, if an input for selecting a desired detection region desired by the user for use and an imaging condition corresponding thereto is received via the operation unit 410, the detection condition determination unit 405 determines the selected detection region and imaging condition as detection conditions, and this flow is ended.

The threshold T may be changeable by the user via the operation unit 410. In this case, if the region determination unit 403 receives the change of the threshold T from the operation unit 410, the processing returns to step S1109. In step S1109, the detectable region $D_S(T)$ is recalculated and presented again on the display unit 409.

As described above, according to the second exemplary embodiment, it is possible to determine a detection region by estimating a detectable region based on statistical information that uses analysis videos captured and collected in advance, In the first and second exemplary embodiments, the description has been given of a method of selecting a detection condition suitable for a single monitoring camera. Nevertheless, when a plurality of monitoring cameras is operated in cooperation, it is desirable to set a detection condition so as to be suitable as a combination in the entire monitoring camera system. In a third exemplary embodiment, in a monitoring camera system that operates a plurality of monitoring cameras in cooperation, a method that allows setting of a detection condition suitable as a combination in the entire system will be described. In the third exemplary embodiment, parts added to the first exemplary embodiment or changed from the first exemplary embodiment will be described, and the descriptions of similar parts will be omitted. In the third exemplary embodiment, the description will be given based on the first exemplary embodiment, but the processing of the third exemplary embodiment can be similarly applied also to the second exemplary embodiment. In the following description, an example in which two monitoring cameras are operated in cooperation will be used. The similar processing can also be performed in a case where the number of monitoring cameras is three or more.

FIG. 13A is a diagram illustrating a top view map for describing an example case where two monitoring cameras are used. As in this example, the user attempts to detect a detection target using a monitoring camera 1301 and a monitoring camera 1302, and a desired detection region identified based on the designation of the user corresponds to a range 1303. FIG. 13B illustrates a detection region considered to be suitable in the example illustrated in FIG. 13A, and a region 1305 corresponds to a detection region of the monitoring camera 1301 and a region 1304 corresponds to a detection region of the monitoring camera 1302. Nevertheless, if the respective detection regions of the monitoring cameras are simply defined independently, a detection region like a region 1306 illustrated in FIG. 13C is set, and an overlap portion between the detection regions of the both cameras is generated, and a detection region in a front side portion of the monitoring camera 1301 becomes narrow.

In view of the foregoing, in the third exemplary embodiment, a method of setting a suitable detection region when a plurality of monitoring cameras is operated as illustrated in FIG. 13A will be described.

The flow in the third exemplary embodiment is basically similar to the flow illustrated in FIG. 7, but in the third exemplary embodiment, the imaging condition S used in step S709 is advanced to imaging conditions of a combination of a plurality of monitoring cameras.

FIGS. 14A to 14D illustrate an example of items to be used as imaging conditions and lists 1401 to 1404 indicating ranges of values corresponding to each imaging condition in the third exemplary embodiment.

In the third exemplary embodiment, as illustrated in a list 1401 in FIG. 14A, values of pan, tilt, and zoom are held for each of two monitoring cameras, i.e., a camera 1 and a camera 2, as independent imaging conditions. An environmental condition that is independent of a camera, e.g., an illumination condition such as the state of a blind, as described in the second exemplary embodiment is also held in the list. A list 1402 illustrated in FIG. 14B illustrates an example of a list holding specific items of imaging conditions and ranges of values, and an imaging condition of the entire system is defined based on each combination of an item of a camera and a setting value of an environmental condition.

In the third exemplary embodiment, the region determination unit 403 searches combinations of the eight items in the list that have been described above as imaging conditions, and searches for an imaging condition $S_{max}$ under which a detectable region on the top view map becomes largest and a detection region $R(H, S_{max})$ under the condition. Nevertheless, if all the combinations are searched, the number of combinations exponentially increases and a very long time is taken for the determination of a detection region when the number of cameras increases. In this case, the following method may be used to reduce a processing amount. In the method, imaging conditions are divided into partial imaging conditions for each monitoring camera, a detectable region is obtained for each of the partial imaging conditions using the method in the first exemplary embodiment, and then detectable regions of the respective partial imaging conditions are combined. Alternatively, a processing amount may be reduced by a method of sequentially determining an imaging condition for each camera in the order of the widest detection regions using a greedy algorithm, for example, or a method of sequentially determining an imaging condition from a region in which visual fields of a number of cameras overlap, for example.

A list 1403 in FIG. 14C and a list 1404 in FIG. 14D illustrate an example in which the imaging conditions in the list 1402 in FIG. 14B are divided into partial imaging conditions. The partial imaging condition includes a combination of items of an individual camera and related environmental conditions, and each partial imaging condition is similar to the imaging condition in the first exemplary embodiment. In this example, an environmental condition of the blind (illumination condition) is included only in the partial imaging condition of the camera 1 having an imaging range located near the blind.

First of all, the region determination unit 403 calculates detectable regions $G(S11), \ldots$, and $G(S1n)$ of the camera 1 for the respective partial imaging conditions $S11, \ldots$, and Sin that can be used by the camera 1. In a similar manner, the region determination unit 403 calculates detectable regions $G(S21), \ldots$, and $G(S2m)$ of the camera 2 for the respective partial imaging conditions $S21$, and $S2m$ that can be used by the camera 2. Next, the region determination unit 403 obtains a union $G(S1i) \cup G(S2j)(1 \le i \le n, 1 \le j \le m)$ of the detectable region $G(S1i)$ of the camera 1 and the detectable region $G(S2j)$ of the camera 2. Furthermore, the region determination unit 403 obtains a combination of the partial imaging conditions $\{S1i, S2j\}$ under which an area of the detection region $R(H, \{S1i, S2j\})$ on the top view map becomes largest, among the union $G(S1i) \cup G(S2j)$. Then, the region determination unit 403 sets an imaging condition obtained by integrating these partial imaging conditions $S1i$ and $S2j$, as an imaging condition $S_{max}$ under which the detectable region on the top view map becomes largest. In addition, the region determination unit 403 excludes incompatible environmental conditions from among the combination of the partial imaging conditions $S1i$ and $S2j$. For example, when the partial imaging condition $S1i$ indicates "illumination: all lit" and the partial imaging condition $S2j$ indicates "illumination: off", because the environmental conditions are incompatible, these conditions are excluded.

In the third exemplary embodiment, a method of adding a restriction on a detection region may be used for further reducing a processing amount. FIG. 14E is a diagram illustrating an example in which the designation of a focused image capturing point 1405 is added to the desired detection region described with reference to FIG. 13A. The focused image capturing point 1405 is a point indicating an important location at which the user strongly desires image capturing to be performed. If a focused image capturing point is designated by the user via the operation unit 410 in addition to a desired detection region, the region determination unit 403 determines a detectable region in view of the focused image capturing point. In addition, FIG. 14E illustrates an example in which the entrance of the building is designated as the focused image capturing point 1405, and a region including the focused image capturing point 1405 is determined as a detectable region.

If a restriction that requires a focused image capturing point to be included is imposed, the region determination unit 403 can exclude a combination of partial imaging conditions {S1*i*, S2*j*} under which neither of the detectable regions G(S1*i*) and G(S2*j*) includes the focused image capturing point.

A plurality of focused image capturing points may be designated, and in this case, the region determination unit 403 searches for an imaging condition such that a detection region includes all the focused image capturing points, In the third exemplary embodiment, if an imaging condition for including all the focused image capturing points is not obtained, a warning similar to that in step S710 of the above-described exemplary embodiment may be given. According to the third exemplary embodiment, with the above-described configuration, it is possible to determine a detection condition suitable for a whole system even when a plurality of monitoring cameras is used.

In the first to third exemplary embodiments, the description has been given using, as an example, a system that detects one type of characteristic, i.e., detects a person who is exhibiting an abnormal behavior. Nevertheless, in some cases, there is a plurality of characteristics desired to be detected, and a plurality of detection methods is desired to be used. At this time, a detectable region generally varies among the detection methods due to a difference in characteristics of detection processing, and it is therefore necessary to set a detection condition appropriate as a whole.

In view of the foregoing, in a fourth exemplary embodiment, a method of simultaneously adjusting different detectable regions in a system having a plurality of detection methods will be described.

Figure 15:
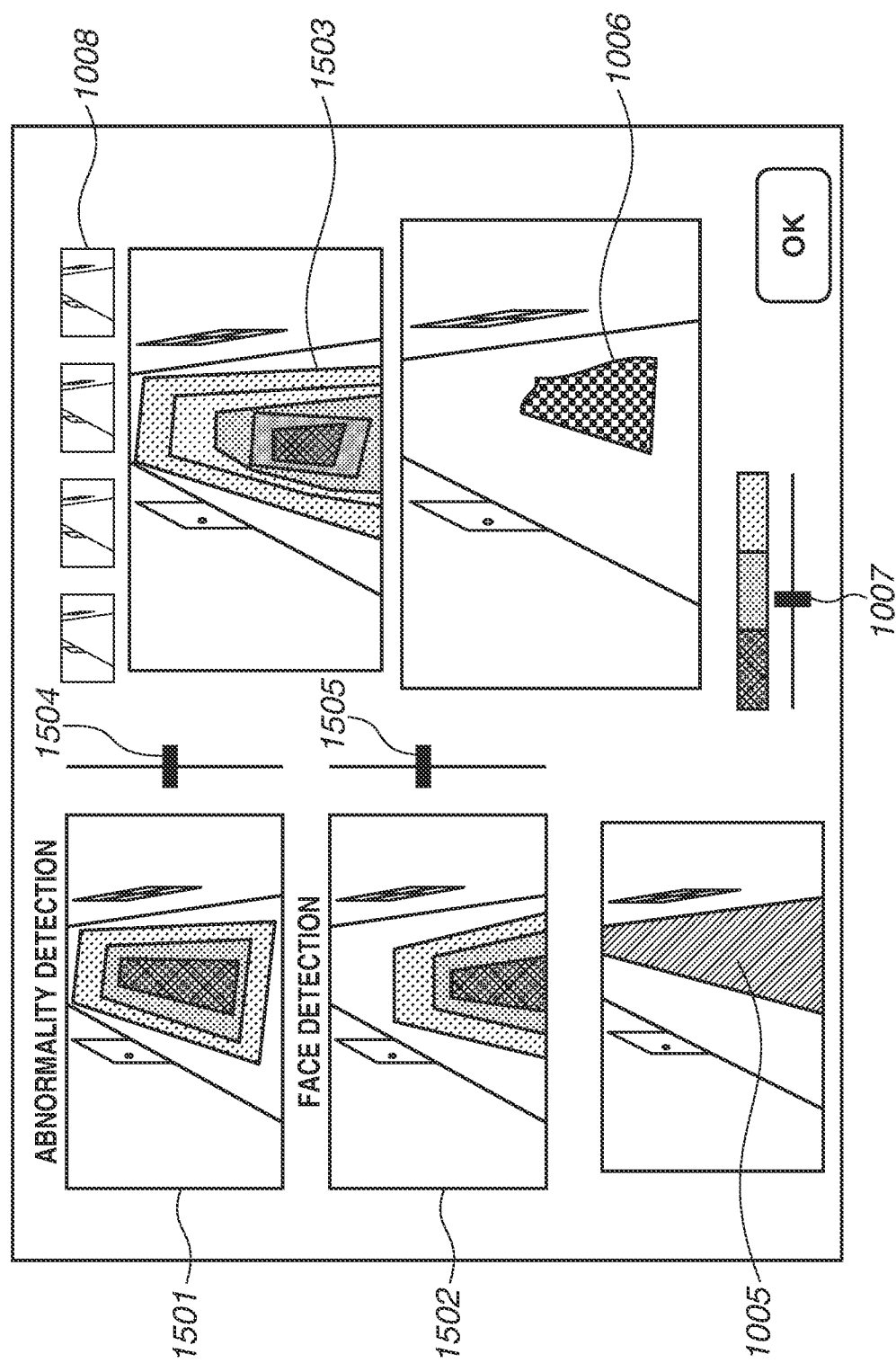
FIG. 15 is a diagram illustrating a display screen example in a default setting according to a fourth exemplary embodiment.

The detection unit 402 in the fourth exemplary embodiment performs face detection of a person using a known method in addition to abnormality detection processing of detecting a person who is exhibiting an abnormal behavior, FIG. 15 is a diagram illustrating an example in which the detection condition setting screen described with reference to FIG. 10C in the second exemplary embodiment is advanced to have two types of detection methods according to the fourth exemplary embodiment. In FIG. 15, components assigned the same reference numerals as those in FIG., 10C have the same functions as those described in the second exemplary embodiment, and the descriptions thereof will be omitted. Hereinafter, parts added in the fourth exemplary embodiment will be described.

Distributions 1501 and 1502 of detectable regions are displayed for the respective detection methods. The distribution 1501 indicates an example of a distribution of a detectable region in abnormality detection, and the distribution 1502 indicates an example of a distribution of a detectable region in face detection. In the abnormality detection, features are detected from the entire body of a human. For example, if a part of a human body falls outside the screen on a front side, detectability declines. Meanwhile, in the face detection, because it is only required that a face is included, a face is highly likely to be detected even at a point closer to the front side. Nevertheless, because a face is relatively smaller than a human body, for example, if an image of the face becomes small on the rear side, it sometimes is difficult to identify the feature of the face.

A distribution 1503 indicates a distribution obtained by combining distributions of two detectable regions: the distribution 1501 of the detectable region in the abnormality detection and the distribution 1502 of the detectable region in the face detection. The region determination unit 403 obtains the distribution 1503 by calculating weighted average at each point in the two distributions in abnormality detection and face detection, and then performing smoothing. The distribution 1503 is a distribution indicating a portion with high detectability in both of the abnormality detection and the face detection.

In addition, in the present exemplary embodiment, weights to be added to the distributions representing two detectable regions in abnormality detection and face detection are adjustable using slide bars 1504 and 1505. If the slide bars 1504 and 1505 are adjusted by the user, the region determination unit 403 sets weights to be added to the distributions of two detectable regions, in accordance with the adjusted values. The user can thereby perform a setting for increasing the priority of face detection for entrance and exit management, by adjusting the slide bar 1505 corresponding to face detection, as for a high-traffic location such as an entrance. In addition, the user can perform a setting for prioritizing abnormality detection by adjusting the slide bar 1504 corresponding to abnormality detection, as for an unfrequented location beyond eyeshot, for example.

In addition, as a calculation method of an integrated distribution, a method of obtaining a geometric mean or a maximum value of points of the distributions, or another method such as a method of using a convolution average instead of performing calculation for each point may be used.

In addition, in the fourth exemplary embodiment, the detection region 1006 is determined from a detectable region defined from the integrated distribution, and the desired detection region 1005.

The flow according to the fourth exemplary embodiment is similar to the above-described flow illustrated in FIG. 11, but in the fourth exemplary embodiment, the following processing is added due to the detection unit 402 that is configured to execute a plurality of detection methods.

In the fourth exemplary embodiment, in step S1104, the detection condition determination unit 405 performs face detection in addition to human body detection, and in step S1105, also records information regarding the detected face.

In addition, in step S1108, the region determination unit 403 estimates distributions of detectability for the respective detection methods, and creates the above-described integrated distribution from these distributions. For the detectability of face detection, a function of detectability is predefined from the size of a width of an eye in the face, for example, using a formula or a table, separately from that for abnormality detection. Then, the region determination unit 403 sets a region defined by the integrated distribution and a threshold as a final detectable region.

In addition, in step S1109, the region determination unit 403 displays a detection region via the display unit 409 as illustrated in FIG. 15, and also displays a detectable region corresponding to each detection method.

In the fourth exemplary embodiment, in step S1110, the user can also designate weight corresponding to each detection method, in accordance with the input performed using the slide bar 1504 or 1505 in FIG. 15 via the operation unit 410.

According to the fourth exemplary embodiment, in the above-described manner, it is possible to simultaneously adjust different detectable regions in a system having a plurality of detection methods. In a case where the number of detection methods increases to three or more, a method similar to the above-described method can be also applied.

In the first to fourth exemplary embodiments, the description has been given of an example of a system in which the user can specifically designate a desired detection condition as a desired detection region. In some cases, however, it is difficult for a user to designate a specific desired detection region. In a fifth exemplary embodiment, a method of enabling the user to designate a desired detection condition more flexibly based on environmental information about an imaging point will be described.

FIGS. 16A to 16F are diagrams illustrating a setting method of a desired detection condition according to the fifth exemplary embodiment.

A point 1601 illustrated in FIG. 16A and a point 1602 similarly illustrated in FIG. 16B indicate points with an uneven surface. A region 1603 illustrated in FIG. 16A and a region 1604 illustrated in FIG. 16B indicate regions in front of a door. For example, in the areas with an uneven surface indicated by the points 1601 and 1602, a person is likely to stumble. In the regions in front of the door as indicated by the regions 1603 and 1604, there is a possibility that people collide with each other, for example. In such cases, it can be expected the user desires to set the points 1601 and 1602 and the regions 1603 and 1604 as caution regions to be detected. Nevertheless, it is not always easy to specifically predict in advance a point where a possibility of abnormality is high, and designating the point as a caution region. For example, it is sometimes difficult to visually recognize the unevenness at the point 1601 from the camera video, and the user can possibly fail to pay attention to the possibility of collision if there is no information to be particularly emphasized, in a region in front of the door in the region 1603, for example.

In view of the foregoing, in a fifth exemplary embodiment, the description will be given of an example in which the user sets a desired detection condition using a dialog 1605 for desired detection condition designation as illustrated in FIG. 16C, instead of directly designating a desired detection region.

The detection condition determination unit 405 initially collects environmental information in an imaging environment. The environmental information includes information such as a building layout diagram of a top view map, a design drawing, and a map of a surrounding area, a result of object recognition obtained from a camera video, and position information of a measuring device or a GPS included in the camera. Then, the detection condition determination unit 405 detects a caution point based on these pieces of environmental information and a desired detection condition of the user.

The dialog 1605 includes radio buttons 1606 for designating prioritized conditions of a detection region, and if the user selects a condition desired to be prioritized, from among the radio buttons 1606, the detection condition determination unit 405 acquires information regarding the selected radio button.

At this time, for example, if a button corresponding to "as large as possible" is selected from among the radio buttons 1606, the detection condition determination unit 405 sets a detection condition for setting a larger detection region, by processing similar to that in the first exemplary embodiment. In addition, for example, a button corresponding to "uneven road surface" is selected, the detection condition determination unit 405 registers a region with unevenness as a caution point from a top view map included in environmental information, and determines a detection region in such a manner that a detectable region includes the caution point. In addition, for example, if a button corresponding to "possibility of collision at an encounter point" is selected, the detection condition determination unit 405 registers regions facing doors included in environmental information as caution points, and determines a detection region in such a manner that a detectable region includes the caution points. In all of these cases, if a plurality of caution points is detected, the detection condition determination unit 405 determines a detection region in such a manner that the detected caution points are included.

In addition, a video indicating regions of caution points such as the point 1601 and the region 1603 may be displayed on the display unit 409 as reference information, but if there is a number of monitoring cameras and the display is complicated, the video needs not be always displayed.

As another example, a method of determining detection regions in accordance with prioritized conditions, and then, presenting the detection regions to the user to prompt the user to select a detection region may be used instead of the user explicitly designating a detection condition using the dialog. A detection region 1608 in FIG. 16D indicates a detection region determined based on the condition of the button corresponding to "as large as possible" among the radio buttons 1606. A detection region 1609 in FIG. 16E indicates a detection region determined based on the condition of the button corresponding to "uneven floor surface" among the radio buttons 1606. A detection region 1610 in FIG. 16F indicates a detection region determined based on the condition of the button corresponding to "possibility of collision at an encounter point" among the radio buttons 1606. Among these detection regions 1608, 1609, and 1610, in particular, a region 1611 indicates a detection region, a portion of a region 1615 indicates a caution point used for the determination of the detection region, and a portion of a region 1614 indicates an unused caution point.

The detection condition determination unit 405 determines the detection regions using the respective prioritized conditions, and displays the determined detection regions via the display unit 409. For example, if the user selects a region to be actually used for detection, from among the three detection regions, an effect similar to that produced by the dialog 1605 for desired detection condition designation is obtained. In this case, however, the user can determine a detection region without explicitly selecting a presented prioritized condition.

When the above-described detection regions are determined, in step S705, in determining a detection condition S, the detection condition determination unit 405 is only required to operate so as to maximize a score IS indicating the number of included caution points, instead of maximizing the detection region R(H,S) that is based on the desired detection region H. The score IS is defined as the number of caution points fully included in the detectable region G(S). In addition, as for a partially included caution point, a percentage of the caution point may be added to the score IS or a bonus corresponding to the size on the camera image may be added.

As a caution point obtained from environmental information, aside from the above-described examples, an object such as a fire extinguisher placed at an imaging point, a hole such as a manhole, a cord over which a person can possibly stumble, a dangling object against which a person can possibly bump his/her head, and a heat source that can possibly cause burn injury may be added. In addition, conditions such as a slope or a recess on the floor surface as well as unevenness, and a point where an illumination is dark or a point where a change is large may be added. Furthermore, a prioritized condition obtained by combining these conditions, such as a dangling object at a dark location, may be set, or a plurality of prioritized conditions may be selectable in accordance with set priorities.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-036157, filed Feb. 28, 2019, which is hereby incorporated by reference herein in its entirety.

What is claimed is:

1. An information processing apparatus comprising:
a processor; and
a memory storing executable instructions which, when executed by the processor, cause the information processing apparatus to perform operations including:
setting an imaging condition under which an imaging apparatus captures a video;
determining a first region in which a detection target can be detected based on at least a size of the detection target;
acquiring a second region determined by a user; and
determining a detection region under which the detection target is detected from the video, based on the first region and the second region,
wherein the detection region is a region where the first region and the second region overlap,
wherein the detection region is adjusted to be less than the first region when the detection target is detected in the second region;
displaying at least one of the first region, the second region, or the detection region.

2. The information processing apparatus according to claim 1, wherein executing the executable instructions causes the information processing apparatus to perform further operations including: detecting the detection target from the detection region.

3. The information processing apparatus according to claim 1, wherein the detection region is a region in a video in which the detection is to be executed.

4. The information processing apparatus according to claim 1,
wherein the imaging condition includes an imaging direction of the imaging apparatus, and
wherein the first region is determined based on the imaging direction.

5. The information processing apparatus according to claim 1, wherein the detection region is determined based on a plurality of first regions.

6. The information processing apparatus according to claim 1, wherein the second region includes a caution point that is based on environmental information.

7. A non-transitory computer—readable storage medium storing a program for causing a computer to function as each unit of the information processing apparatus according to claim 1.

8. The information processing apparatus according to claim 1,
wherein the imaging condition is set as a set of predetermined conditions, and
wherein the first region is determined for each of the predetermined conditions.

9. The information processing apparatus according to claim 8, wherein the detection region is determined among a plurality of detection regions for each of the predetermined conditions.

10. The information processing apparatus according to claim 1, wherein the first region is determined for each of the imaging condition.

11. The information processing apparatus according to claim 10, wherein the first region is determined based on a video including a focused image capturing point designated by a user, among the plurality of videos captured by the imaging apparatus.

12. The information processing apparatus according to claim 1,
wherein the first regions is determined for each of a plurality of detection targets, and
wherein the detection region is determined based on the first region determined for each of the plurality of detection targets.

13. The information processing apparatus according to claim 12, wherein a plurality of detectable regions includes priorities designated by a user.

14. The information processing apparatus according to claim 1, wherein the first region is determined based on a result obtained by analyzing a video for analysis that has been captured in advance by the imaging apparatus.

15. The information processing apparatus according to claim 14, wherein the first region is determined based on a distribution of appearance of the detection target based on the video for analysis.

16. The information processing apparatus according to claim 14, wherein the video for analysis is a video captured for each of a plurality of different imaging conditions.

17. An information processing method comprising: setting an imaging condition under which an imaging apparatus captures a video; determining a first region in which a detection target can be detected based on at least a size of the detection target; acquiring a second region determined by a user; and determininga detection region under which the detection target is detected from the video, based on the first region and the second region; wherein the detection region is a region where the first region and the second region overlap, wherein the detection region is adjusted to be less than the first region when the detection target is detected in the second region; displaying at least one of the first region, the second region, or the detection region.

\* \* \* \* \*